US011715046B2

(12) United States Patent
Mitelman

(10) Patent No.: US 11,715,046 B2
(45) Date of Patent: Aug. 1, 2023

(54) ENHANCING DATA-ANALYTIC VISUALIZATIONS WITH MACHINE LEARNING

(71) Applicant: MICRO FOCUS LLC, Santa Clara, CA (US)

(72) Inventor: Tamir Mitelman, Petah Tikva (IL)

(73) Assignee: MICRO FOCUS LLC, Santa Clara, CA (US)

(*) Notice: Subject to any disclaimer, the term of this patent is extended or adjusted under 35 U.S.C. 154(b) by 144 days.

(21) Appl. No.: 16/928,226

(22) Filed: Jul. 14, 2020

(65) Prior Publication Data

US 2022/0019947 A1    Jan. 20, 2022

(51) Int. Cl.
*G06Q 10/063*   (2023.01)
*G06N 20/00*   (2019.01)
*G06F 16/904*   (2019.01)

(52) U.S. Cl.
CPC ......... *G06Q 10/063* (2013.01); *G06F 16/904* (2019.01); *G06N 20/00* (2019.01)

(58) Field of Classification Search
None
See application file for complete search history.

(56) References Cited

U.S. PATENT DOCUMENTS 9,218,574 B2 * 12/2015 Phillipps ................ G06N 20/20
9,418,337 B1 * 8/2016 Elser ................... G06F 16/2468
10,007,708 B2 * 6/2018 Moser ................... G06T 11/206
10,110,617 B2   10/2018 Muddu et al.

(Continued)

FOREIGN PATENT DOCUMENTS

EP          3005056 B1 *  4/2022  ............ G06N 20/00
WO   WO-2014194000 A1 * 12/2014  ............ G06N 20/00

(Continued)

OTHER PUBLICATIONS

Hu, Kevin, et al. "Vizml: A machine learning approach to visualization recommendation." Proceedings of the 2019 CHI Conference on Human Factors in Computing Systems. 2019. (Year: 2019).*

(Continued)

*Primary Examiner* — Timothy Padot
*Assistant Examiner* — Derick J Holzmacher
(74) *Attorney, Agent, or Firm* — Sheridan Ross P.C.

(57) ABSTRACT

This document describes techniques and apparatuses for enhancing data-analytic visualizations of a data analytics system. A computing device captures input data and output data associated with a data-analytic visualization generated by an advanced user using the data analytics system. The input data and output data are mapped together for defining the data-analytic visualization generated. A machine learning model is trained relative to the mapped input data and output data for generating the data-analytic visualization. During a normal usage of the data analytics system by a user, the trained model generates data-analytic visualizations to suggest to the user responsive to input data from the user. An optional threshold is set and applied relative to the data-analytic visualizations generated. If a data-analytic visualization meets the threshold, the data analytics system reports the data-analytic visualization.

20 Claims, 11 Drawing Sheets

(56) References Cited

U.S. PATENT DOCUMENTS

| | | | |
|---|---|---|---|
| 10,375,098 B2 | 8/2019 | Oliner et al. | |
| 10,756,992 B2* | 8/2020 | Simitsis | H04L 43/0876 |
| 11,461,368 B2* | 10/2022 | Das | G06F 16/285 |
| 2008/0288889 A1* | 11/2008 | Hunt | G06Q 30/02 |
| | | | 715/810 |
| 2011/0264663 A1* | 10/2011 | Verkasalo | G06F 9/455 |
| | | | 707/E17.014 |
| 2014/0280142 A1* | 9/2014 | Wasson | G06F 16/2465 |
| | | | 707/737 |
| 2014/0358825 A1* | 12/2014 | Phillipps | G06N 20/20 |
| | | | 706/11 |
| 2015/0019569 A1* | 1/2015 | Parker | G06F 16/3344 |
| | | | 707/748 |
| 2015/0278213 A1* | 10/2015 | Anand | G06F 16/24578 |
| | | | 707/723 |
| 2015/0278214 A1* | 10/2015 | Anand | G06F 16/248 |
| | | | 707/748 |
| 2015/0317337 A1* | 11/2015 | Edgar | G16H 50/70 |
| | | | 707/751 |
| 2015/0339376 A1* | 11/2015 | Wieweg | G06F 16/51 |
| | | | 717/145 |
| 2016/0124960 A1* | 5/2016 | Moser | G06T 11/206 |
| | | | 707/723 |
| 2017/0206684 A1* | 7/2017 | Duncker | G06F 40/143 |
| 2018/0027006 A1 | 1/2018 | Zimmermann et al. | |
| 2018/0046926 A1* | 2/2018 | Achin | G06N 20/20 |
| 2018/0173372 A1* | 6/2018 | Greenspan | G06F 16/2465 |
| 2018/0183827 A1 | 6/2018 | Zorlular et al. | |
| 2018/0219889 A1* | 8/2018 | Oliner | G06N 3/04 |
| 2018/0357292 A1* | 12/2018 | Rai | G06F 16/2455 |
| 2018/0357556 A1* | 12/2018 | Rai | G06N 20/00 |
| 2018/0357595 A1* | 12/2018 | Rai | G06Q 10/087 |
| 2019/0034767 A1* | 1/2019 | Sainani | G06V 40/1347 |
| 2019/0068627 A1 | 2/2019 | Thampy | |
| 2019/0102700 A1* | 4/2019 | Babu | G06N 5/025 |
| 2019/0172564 A1* | 6/2019 | Chandra | G06N 20/00 |
| 2019/0260804 A1 | 8/2019 | Beck et al. | |
| 2019/0378074 A1* | 12/2019 | Mcphatter | G06Q 10/067 |
| 2020/0210647 A1* | 7/2020 | Panuganty | G06N 20/10 |
| 2020/0250472 A1* | 8/2020 | Abhyankar | G06T 11/206 |
| 2020/0349169 A1* | 11/2020 | Venkatesan | G06F 16/215 |
| 2020/0379609 A1* | 12/2020 | Jacob | G06N 7/01 |
| 2020/0401299 A1* | 12/2020 | Hafertepen | G06Q 50/01 |

FOREIGN PATENT DOCUMENTS

| | | | | |
|---|---|---|---|---|
| WO | WO-2014204970 A1 * | 12/2014 | | G06N 99/005 |
| WO | WO-2016048912 A1 * | 3/2016 | | G06F 16/2282 |
| WO | WO-2018144897 A1 * | 8/2018 | | G06N 20/20 |

OTHER PUBLICATIONS

Leban, Gregor, et al. "Vizrank: Data visualization guided by machine learning." Data Mining and Knowledge Discovery 13.2 (2006): 119-136. (Year: 2006).*

Luo, Yuyu, et al. "Deepeye: Towards automatic data visualization." 2018 IEEE 34th international conference on data engineering (ICDE). IEEE, 2018. (Year: 2018).*

A Survey for visualization Systems for Malware Analysis; M. Wagner, et al.; 21 pages; 2015.

VizMal: A Visualization Tool for Analyzing the Behavior of Android Malware; Alessandro Bacci, et al.; 9 pages; 2017.

* cited by examiner

ENHANCING DATA-ANALYTIC VISUALIZATIONS WITH MACHINE LEARNING

BACKGROUND

Extremely large data sets that can be analyzed systematically or computationally to reveal patterns, trends, anomalies, and associations of information in the data sets are known as big data. These data sets are often too large or complex to be dealt with by traditional means or standard data-processing application software. Analyses and investigations relating to big data often require the use of visualizations, such as bar charts, pie charts, line charts, scatter plots, and other visual depictions, in order to make sense of the huge volumes of data. For example, in cybersecurity, events associated with different activities, alerts, entities, or threats may be monitored to identify suspicious or malicious activity relative to managed data, networks, computing systems, hosts, devices, or programs. The amount of data associated with these events may often be overwhelming to comprehend. As such, visualizations are extremely helpful to summarize, in a graphic perspective, the data and activity at issue.

However, because there are numerous ways to visualize a data set, multiple factors, parameters, and decisions must be considered in order to obtain an accurate, relevant, and telling story about the data. A single choice regarding how to visualize the data could be the defining factor between exposing an important criteria and entirely missing it. Appropriately defining visualizations by accurately considering and selecting among the many parameters for defining the visualizations can make all the difference between identifying and overlooking relevant information.

DETAILED DESCRIPTION

This document describes example techniques and apparatuses for enhancing data-analytic visualizations of a data analytics system. A computing device captures input data and output data associated with a data-analytic visualization generated by an advanced user using the data analytics system. The input data and output data are mapped together for defining the data-analytic visualization. A machine learning model is trained relative to the mapped input data and output data. During a normal use of the data analytics system, the trained model is referenced to generate the data-analytic visualization responsive to user input data. Optionally, a threshold is applied relative to the data-analytic visualization generated by the trained model. If the threshold is met, the data-analytic visualization is reported by the data-analytics system as an effective visualization.

Figure 1:
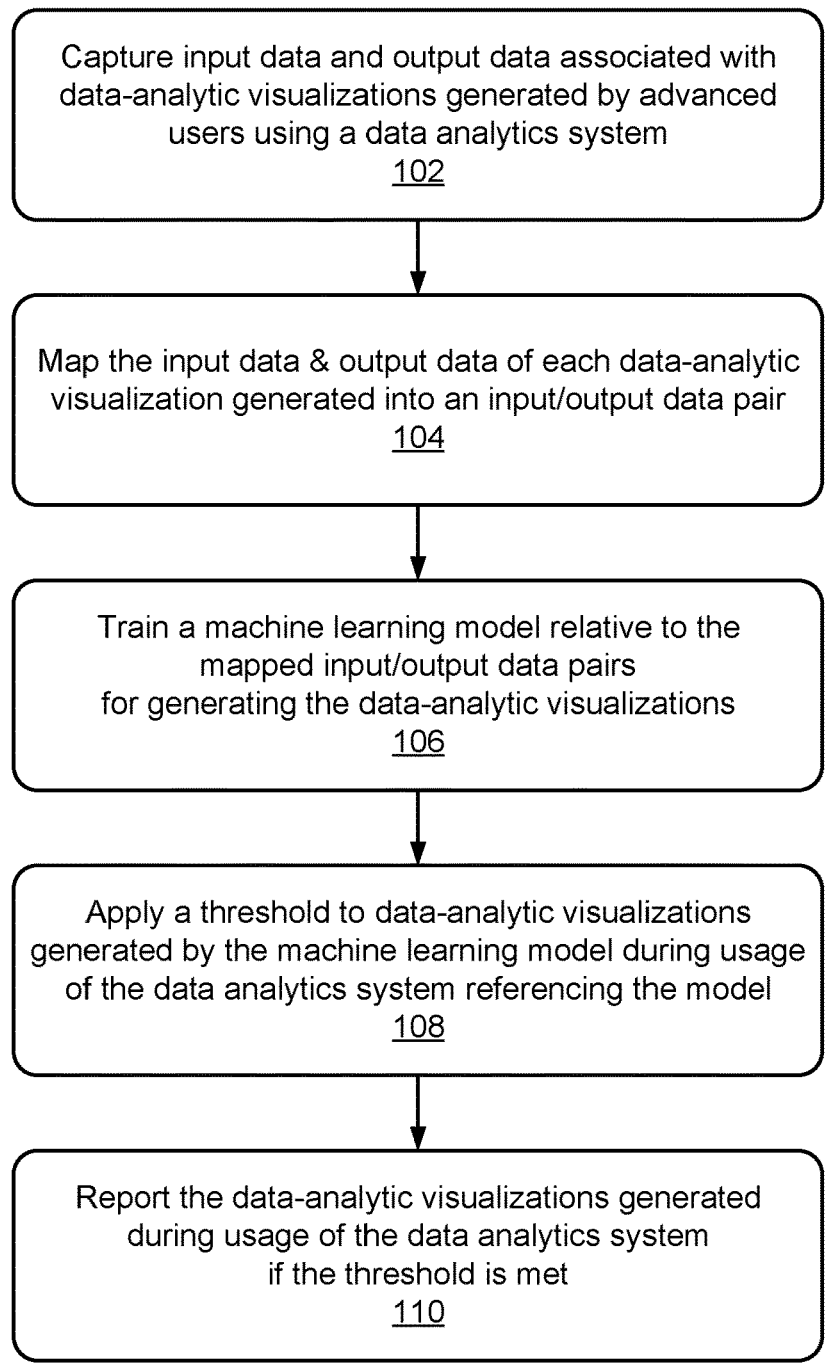
FIG. 1 is a flow chart illustrating a first example method of enhancing data-analytic visualizations of a data analytics system.

FIG. 1 is a flow chart illustrating an example method 100 of enhancing data-analytic visualizations of a data analytics system. The data analytics system may be any data system implemented to analyze data. For example, the data analytics system may be a security analytics system relevant to analyzing cybersecurity issues of managed data, networks, computing systems, devices, and/or programs. Similarly, the data analytics system may provide data analytics relevant to other business analytics or intelligence needs, such as logistics, supply management, marketing, sales, information technology management, resource management, and the like.

At 102, input data and output data are captured from data-analytic visualizations generated by advanced users using the data analytics system. For ease of discussion, input data and output data may be collectively referred to as "input/output data," and a data-analytic visualization may simply be referred to as a "visualization." As an advanced user pursues an analytic investigation using the data analytics system, and desires to generate a data-analytic visualization, the advanced user selects certain input data, or data fields, relevant to the investigation. This input data enables the data analytics system to generate a data-analytic visualization. After the advanced user generates a data-analytic visualization, it is then deconstructed to capture the input data and output data that fully define the data-analytic visualization generated.

This input data and output data captured provide an input/output data pair that will be used to train a machine learning model in a subsequent step. This will allow the machine learning model to generate the data-analytic visualization again based on other user input data received by the machine learning model. Input data captured from each data-analytic visualization may include data fields selected by the advanced user that are associated with generating the visualization while using the data analytics system. For example, in a data analytics system focused on security analytics, input data may include data fields defining bytes in, bytes out, destination address, destination hostname, destination port, destination username, device receipt time, source address, source port, source username, and so forth. Input data may also include external profiling attributes, for example, an overall time range associated with the visualization data, or a user's role in a business organization using the data analytics system (e.g., analytics, research, security, information technology, sales, marketing, support, or a tier level with respect to each of these). Other data analytics systems may have other defined data fields. Input data captured does not refer to the user's search, query, dataset, or parameters which are not the data fields. These are not part of the input, but rather may be part of the output as manifested in the generated data-analytic visualization.

Output data captured from each data-analytic visualization defines the actual fully-finished data-analytic visualization generated by the advanced user. For example, in a data analytics system focused on security analytics, output data may include visual type (e.g., heat map, bar chart, scatter plot, etc.), X-axis parameter data (e.g., device receipt time), Y-axis parameter data (e.g., destination address), additional visual-type specific parameters (e.g., color for heat map), time granularity (e.g., hour, day), angle (e.g., time series by hour, day), metric (e.g., sum of bytes out), order (e.g., ascending or descending), filter (e.g., any input data field), and so forth. Once each data-analytic visualization is generated (e.g., finished), responsive to the advanced user using the data analytics system, this input data and output data is captured from the data-analytic visualization (e.g., the finished data-analytic visualization is deconstructed to capture the input/output data). Optionally, when a data-analytic visualization is generated by an advanced user using the data analytics system, the advanced user may include comments about the visualization and/or investigation. For example, the advanced user may describe why one visualization is more effective than another visualization, or what data fields, parameters, or process-flow steps were considered in generating the visualization. Such comments may be included and captured as part of the output data of each data-analytic visualization generated and recorded into a machine learning model (described below).

In one embodiment, the finished data-analytic visualization generated by the advanced user is taken and deconstructed to capture the input data and output data of the visualization itself. This ensures that the final result from the advanced user's investigation is captured (e.g., the data associated with defining the data-analytic visualization), and not merely the steps getting to the visualization, or other processing or decision making along the way, which may be deemed as noise or distractions associated with generating the finished data-analytic visualization. However, in an alternate embodiment, comments from the advanced user regarding such points may be associated with the finished data-analytic visualization to be captured along with the input/output data. In a further embodiment, identification of pairs of data-analytic visualizations generated sequentially by the advanced user may be captured and recorded into a machine learning model (described below). In this context, if a first data-analytic visualization is generated by an advanced user, and then a second data-analytic visualization is generated by the advanced user following the first data-analytic visualization, then identification data indicative of the sequential generation of this pair of data-analytic visualizations may be captured so as to identify the second data-analytic visualization relative to the first data-analytic visualization. In yet another embodiment, certain process-flow steps associated with generating the data-analytic visualization may be captured. For example, an order in which each data-analytic visualization is generated may be captured and recorded into a machine learning model (described below).

Capturing the input/output data of each data-analytic visualization generated by an advanced user provides an improved method of identifying enhanced or more effective visualizations over tracking all activity of an advanced user relating to generating a specific data-analytic visualization. For example, for a given data analytic investigation, one advanced user might start by generating a visualization #1, and then a visualization #2, and then a visualization #3. On the other hand, a different advanced user might start by generating visualization #2, then visualization #3 and then visualization #1. There may be no right order, and it may be difficult to determine what might lead one advanced user to generate any particular visualization, and in another time lead him to create a different visualization. As such, capturing the input/output data of each visualization actually generated provides a basis of the thought process experienced by an advanced user in generating visualizations. Capturing the advanced user's input data provides a starting point, and capturing the output data representing the full, finished visualization provides the result.

For example, in a security analytics system, there is no way to know in advance what time granularity for a heat map visualization would expose a security anomaly, so the analyst will generally try several granularities. He may create a first heat map by a minute granularity, then a second heat map by an hour granularity, and a third heat map by a day granularity. All three heat maps are very similar, but the time granularity is different. However, all three may need to be generated and reviewed because the one in which the anomaly might be exposed depends on the technique the attacker used, and this may change from attack to attack. In this context, all visualizations may be relevant in many cases. As such, all three may be created by the advanced user in an investigation, and all three would be deconstructed to capture each visualization's input/output data, regardless of their order. So it doesn't necessarily matter the process or order of their creation. The end result is that an advanced user would have created all three visualizations, and the input/output data of each visualization is captured in order to subsequently recreate or generate each visualization again. However, in alternate embodiments, identification data indicative of a pair of data-analytic visualizations consecutively generated may be captured, or process-flow steps indicative of the order in which multiple visualizations are generated may be captured, for alternate variations on perspective in generating enhanced visualizations.

For purposes of this disclosure, an advanced user is considered an expert, an expert analyst, an experienced analyst, or other person recognized as having special skill or knowledge representing a mastery of analytics in his/her domain for using the data analytics system. For example, if the data analytics system is a security analytics system for cybersecurity investigations, then an advanced user is a person recognized as having special skill or knowledge representing a mastery of analytics relating to security analytics for cybersecurity purposes. Input data and output data associated with data-analytic visualizations generated by advanced users are captured because advanced users will typically input the most relevant data to obtain the most effective data-analytic visualizations during investigations. Advanced users typically know how to best visualize data to achieve a certain goal, and know what different angles or views should be checked to conduct a thorough investigation and arrive at the right conclusions. In one aspect, capturing the input data and output data of multiple advanced users over time, and over different investigation scenarios, provides a robust data set for training a machine learning model (described below).

The value of capturing input data and output data associated with data-analytic visualizations generated by an advanced user, rather than a novice user, is especially realized in the context of recognizing that there are numerous factors that should be considered regarding visual analytics and generating data-analytic visualizations. For example, data visualization aspects to consider may include:
- chart type (e.g., heat map, bar chart, scatter plot, line chart)
- time granularity (e.g., minutes vs. hours vs. days vs. weeks)
- metrics (e.g., count vs. distinct count vs. value itself vs. maximum value vs. minimum value vs. average)
- aggregations (e.g., by hours, days)
- angle (e.g., count visual vs. time series vs. relationship graph vs. patterns)
- discrete data points vs. continuous line
- axis parameters, and the like.

These multiple factors may affect the resulting data-analytic visualization, even when using the exact same data for the same goal, and even for the exact same visualization type. Therefore, many factors should be considered in defining data-analytic visualizations to reach appropriate conclusions about the data, and to effectively conduct a proper and thorough investigation for the business purpose. For example, in the context of cybersecurity investigations, a small change in metric, angle, or granularity can be the crucial difference between exposing a threat and entirely missing it.

Referring again now to method 100, at 104, the input/output data captured from each data-analytic visualization generated are mapped into an input/output data pair. Specifically, input/output data captured relevant to each given data-analytic visualization generated are mapped together into a data pair for that given data-analytic visualization. If an advanced user generates multiple data-analytic visualizations during a single investigation, then the input/output data pair from each visualization generated is captured and mapped together for defining each respective data-analytic visualization generated. If a same advanced user works multiple investigations, generating multiple data-analytic visualizations, then an input/output data pair is mapped together with respect to each visualization generated during the multiple investigations. Similarly, the input/output data pair captured from each data-analytic visualization generated by each advanced user using the data analytics system are mapped together, creating multiple input/output data pairs, one for each respective data-analytic visualization generated.

At 106, a machine learning model is trained with these mapped input/output data pairs captured from the data-analytic visualizations generated by the advanced users. The machine learning model is trained so that it may subsequently re-create (e.g., generate) each data-analytic visualization defined by each respective input/output data pair. This input/output data is recorded into the machine learning model, such as by using tables or other data formats accepted by the model. The machine learning model may be a hybrid of supervised and unsupervised learning models, e.g., a semi-supervised learning model, to allow the model to infer output by itself. Alternatively, the machine learning model may be supervised or unsupervised with appropriate configurations. By using a hybrid, semi-supervised, learning model, input may be included without defining the respective output, thus allowing the model to infer by itself. A hybrid model may refer to the visualization input data in whole, or deconstruct it into its single data fields, which isn't the classic input output pair of a typical supervised model. The machine learning model may not identify or generate a visualization based solely on a data pair. Nor does the model find by itself previously undetected patterns. Rather, the machine learning model simply infers an output from a given input based on the input/output data pairs it is given.

In this context, the purpose of the machine learning model is to create and execute a model (e.g., function) that derives an output (e.g., data-analytic visualization) from an input (input data). The model is created during a training phase by using the input/output data pairs provided to it. In a classic supervised machine learning algorithm there are two separated data sets, one for input and another one for output, that together provide an input/output pair. However, this disclosure is unique in the sense that a single entity (e.g., the data-analytic visualization) is used to derive and obtain an input/output pair by deconstructing the single data-analytic visualization to its components. Because a data-analytic visualization is deconstructed to capture the input/output data pair, this is not the typical case of having two data entities with one representing input and the other representing output. The machine learning model is an algorithm, defined by executable instructions either alone and/or in combination with hardware blocks, that, during a training phase, captures, and learns from, the input/output data pairs associated with the data-analytic visualizations generated by advanced users using the data analytics system, to generate enhanced, effective data-analytic visualizations by inferring output data from the input data received.

To determine if and/or when the machine learning model is sufficiently trained, a testing phase may be employed after the training phase. In a testing phase, the machine learning model is referenced by the data analytics system while advanced users perform investigations and generate data-analytic visualizations. The advanced users may then review those generated visualizations to evaluate how well the model is trained. After the machine learning model is sufficiently trained to become a trained model (as defined by design parameters or advanced user decision making), then the model is referenced by the data analytics system when any user, advanced or otherwise, uses the data analytics system to perform visual analytic data investigations and generate data-analytic visualizations. During such a normal, real-time, usage phase, the data analytics system references the trained model to generate enhanced, effective visualizations, responsive to such visual analytic investigations, based on the model having been trained by the advanced users.

At 108, during a normal, real-time usage of the data analytics system by any user, during which the data analytics system references the trained model, one or more thresholds may be applied to the data-analytic visualizations generated by the trained model in response to the user input data. The thresholds are defined with respect to any aspect that may improve the effectiveness, relevance, or value of the data-analytic visualizations generated by the trained model for subsequently reporting to the user. A threshold may also be defined with respect to limiting the number of visualizations to be reported to the user. Thresholds are optional, but when used affect the machine learning model globally, e.g., the thresholds are applicable to all data-analytic visualizations generated by the machine learning model. Those data-analytic visualizations generated by the machine learning model that meet the one or more thresholds will subsequently be reported (e.g., suggested) to the user. The machine learning model in-and-of-itself generates enhanced, effective visualizations responsive to user input data requesting a visualization. However, applying an optional threshold to generated visualizations causes only those visualizations that meet the threshold to be reported to the user, thus further enhancing the effectiveness of the final, reported visualizations.

As an example, if a single, global threshold is applicable to the trained model, then all data-analytic visualizations generated by the trained model, responsive to a use of the data analytics system, must meet that threshold in order to be reported to the user. In another example, if two global thresholds are applied to the trained model, then all data-analytic visualizations generated must meet those two thresholds in order to be reported to the user. Similarly, if "x" number of global thresholds are applied to the trained model, then all data-analytic visualizations generated must meet those "x" number of thresholds in order to be reported to the user.

One example threshold may be defined as a percentage-of-usage of a data-analytic visualization defined in the trained model. This percentage-of-usage is determined relative to advanced users repeatedly generating the same data-analytic visualization in the trained model (e.g., a frequency of usage in the trained model). In this context, if a threshold of a percentage-of-usage is applied, a data-analytic visualization generated by the machine learning model during a normal, real-time usage of the data analytics system will only be reported to the user if the visualization was originally generated by advanced users in training the machine learning model more than the defined percentage-of-usage time (e.g., the defined threshold) relative to input provided and investigations performed by the advanced users.

As an example scenario for this percentage-of-usage analysis, assume that during a training phase certain advanced users, that are analyzing the same input data during several different investigations, create four different data-analytic visualizations identified as: visualization 1, visualization 2, visualization 3, and visualization 4. Also assume visualization 1 was the most repeatedly used by the advanced users, or in other words was the most repeated outcome of analyzing specific input data, at 65% of the time, when that specific input data was visualized. Also assume that visualization 2 was repeatedly used 55% of the time, visualization 3 was repeatedly used 25% of the time, and visualization 4 was repeatedly used only 5% of the time. The business organization defining parameters associated with the machine learning model and the data analytics system can decide what percentage-of-usage threshold to apply so that only those visualizations generated that meet the threshold will be reported (e.g., suggested to the user). For example, if a threshold of 50% percentage-of-usage is applied, then only those visualizations that were repeatedly used in 50% or more times in the trained model (e.g., visualization 1 and visualization 2) will be generated and reported by the trained model and the data analytics system. This ensures that the data-analytic visualizations reported during the normal, real-time usage of the data analytics system are the most effective relative to the set of data-analytic visualizations generated from the trained model.

Another example threshold may be a data-point to data-point change, to automatically focus the reported data-analytic visualizations to those that expose anomalies or patterns in the data. One example of a data-point to data-point change is a value difference (e.g., delta value) of one data-point to an adjacent data-point. For example, a delta value may be a defined percentage increase or decrease in data-point value (e.g., a 50% increase or decrease in one data-point relative to its adjacent data-point). Another example is when the data-point to data-point change may be defined as a time-interval difference (e.g., a communication occurs every hour which implies a pattern). Another example threshold may be set relative to specific advanced user comments identified in the output data of visualizations recorded in the machine learning model. An additional example threshold may be defined as a maximum number of data-analytic visualizations to be reported. For example, if a maximum number is defined as three, then only the top three (e.g., the more effective from a percentage-of-usage analysis) data-analytic visualizations generated will be reported to the user. This avoids reporting too many data-analytic visualizations, and maintains focus on the top three visualizations.

Another example threshold may be defined relative to pairs of data-analytic visualizations generated sequentially by an advanced user. For example, if visualization(X) and visualization(X+1) define a pair of data-analytic visualizations generated sequentially by an advanced user, and if visualization(X+1) is the direct sequel visualization following visualization(X) in more than a defined threshold number of times (e.g., 50%) that visualization(X) was created, it suggests that visualization(X+1) is a relevant, recommended outcome or suggested visualization relative to visualization (X). Yet another example threshold may be the process-flow steps (e.g., order) in which visualizations were generated by an advanced user. For example, a threshold may be set to report only those data-analytic visualizations that were created in a certain order, or that were created in a certain order and were the last "x" number of visualizations created during an investigation by an advanced user. In any case, thresholds may be defined to be globally referenced against the machine learning model in a number of ways by design. For example, depending on a business organization's preference, different levels of users may be authorized to define thresholds. In one example, a system administrator may define thresholds. In another example, thresholds may be defined by an advanced user, and/or by a novice user, using varying combinations, authorizations, and limitations. For example, the data system and/or machine learning model may allow a novice user to define a threshold relative to a number of visualizations to be reported, or relative to reporting only those visualizations that meet a defined percentage-of-usage. This allows the novice user to avoid being overwhelmed by excessive visualizations or less helpful visualizations.

At 110, those data-analytic visualizations generated, during usage of the data analytics system, that meet (or exceed) the one or more thresholds applied, are reported (e.g., suggested) by the data analytics system to the user. In this context, if a data-analytic visualization does not meet a given threshold, it is not reported. On the other hand, if no threshold is set, then the data-analytic visualizations generated are reported without regard to any threshold. In either case, effective, enhanced data-analytic visualizations are generated by referencing the trained model and by optionally applying one or more thresholds to the data-analytic visualizations generated.

Figure 2:
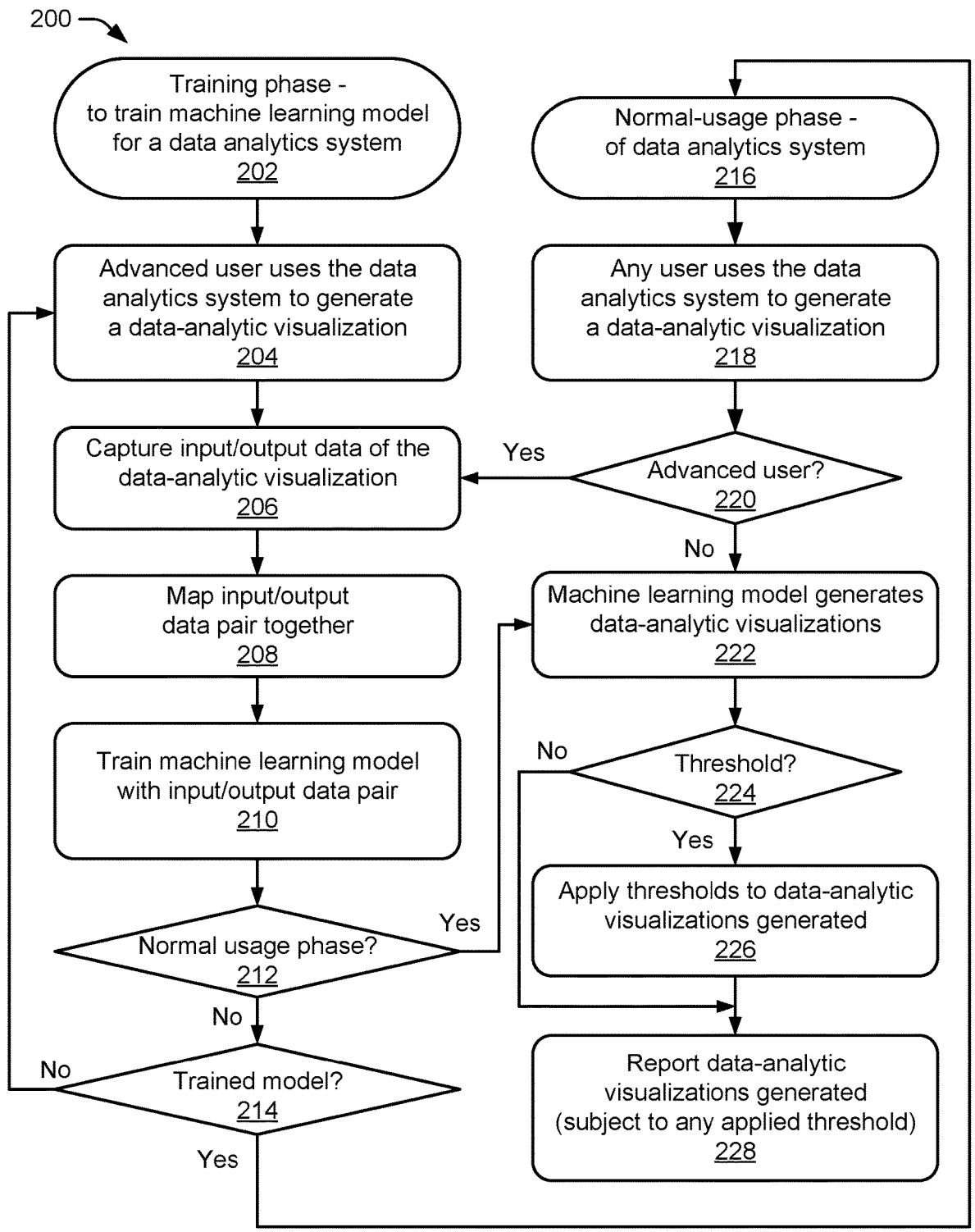
FIG. 2 is a flow chart illustrating a second example method of enhancing data-analytic visualizations of a data analytics system.

FIG. 2 is a flow chart illustrating a second example method 200 for enhancing data-analytic visualizations of a data analytics system. At 202, a training phase initiates training of a machine learning model for the data analytics system. At 204, an advanced user uses the data analytics system to generate a data-analytic visualization for a data investigation. In one example, an advanced user is identified as using the data analytics system by referencing a user profile maintained by a business organization for using the data analytics system. In another example, a secured login may be established by which advanced users may login to the data analytics system for training the machine learning model. Other methods may similarly be used to identify or specify the advanced user using the data analytics system.

At 206, input/output data are captured from the data-analytic visualization generated by the advanced user. In essence, the data-analytic visualization is deconstructed to identify and capture the input data and output data (e.g., input/output data) associated with the visualization. The input data generally includes the data fields selected by the advanced user to generate the data-analytic visualization. The output data generally defines the finished data-analytic visualization. In one embodiment, the output data may include recorded indicia that is indicative of a process-flow associated with generating the data-analytic visualization (e.g., the order in which the visualization was generated by the advanced user during an investigation). At 208, the input/output data are mapped together as a data pair for defining the data-analytic visualization. At 210, a machine learning model is trained with the input/output data pair, for instance, by recording the input/output data pair into tables or other formats accepted by the model. In one example, the machine learning model is a hybrid, semi-supervised model that allows the model to infer output (e.g., data analytic visualizations) by itself based on input data received.

At 212, it is identified that the training phase for the machine learning model is in process, and that the data analytics system is not simply being used in a normal-usage phase. As such, at 214 it is identified whether the machine learning model has been trained sufficiently relative to intended design and business purposes. If the model is not sufficiently trained, then control returns for the advanced user, or another advanced user, to use the data analytics system again. As such, at 204, the advanced user or another advanced user performs another investigation or analysis with the data analytics system to continue training the model. In one aspect, this process is repeated, preferably using multiple advanced users and multiple data investigations, to obtain the broadest and most expert data results, until the model is sufficiently trained at 214.

At 216 a normal-usage phase of the data analytics system begins. This normal-usage phase may optionally begin even before the machine learning model is sufficiently trained, but in such an event, the user of the data analytics system will not be able to leverage the full benefits of a sufficiently trained model. At 218, in this normal-usage phase, any user, including an advanced user, or non-advanced user, for example a novice user or anyone with a skill-set in between the extremes of a novice user and an advanced user, may use the data analytics system. These users perform data investigations and analyses, and generate data-analytic visualizations, by using the data analytics system referencing the trained machine learning model. At 220, if an advanced user is using the data analytics system in this normal-usage phase, then, optionally, the model is continuously trained as previously discussed by capturing input/output data 206, mapping it 208, and further training the machine learning model 210. This continuously develops the model as advanced users continue to use the data analytics system even though the model may have previously been designated as a sufficiently trained model responsive to the training phase. Then, at 212, it is recognized that the advanced user is using the data analytics system in the normal-usage phase. In this context, even as the machine learning model has continued to learn, at 222 the machine learning model is applied, responsive to the user using the data analytics system during the normal-usage phase, to generate data-analytic visualizations.

At 220, in the event a non-advanced user is using the data analytics system, then the training phase steps at 206, 208, and 210 are not performed, and processing continues at 222 to apply the machine learning model with respect to the normal-usage phase to generate enhanced data-analytic visualizations based on user input requests. Regardless of whether an advanced user or a novice user is using the data analytics system in the normal-usage phase for an investigation to generate a data-analytic visualization, at 222 the machine learning model is applied to the usage of the data analytics system to generate data-analytic visualizations. This ensures that enhanced, effective data-analytic visualizations are generated by the data analytics system responsive to any data-analytic visualization request by a user.

In one example, a user (advanced or non-advanced) may input data to generate their own data-analytic visualization, and the machine learning model generates one or more enhanced, effective data-analytic visualizations to potentially suggest to the user. If the user is an advanced user then his generated data-analytic visualization input/output is captured to further train the model as described previously at steps 206, 208, and 210, and based on the advanced user's input the algorithm would suggest additional relevant visualizations. In another example, a user (advanced or non-advanced) may not generate their own data-analytic visualization, but rather simply selects certain input data for the data analytics system to automatically generate a visualization. Then the machine learning model generates one or more effective data-analytic visualizations, based on that input data, to potentially suggest to the user.

At 224, if any optional threshold is set to be applied to data-analytic visualizations generated by the machine learning model, then at 226, those one or more thresholds are applied to the data-analytic visualizations generated by the trained model in response to the user's data-analytic visualization request. The one or more thresholds are applied to the data-analytic visualizations generated by the model so that only those data-analytic visualizations that meet (or exceed) the thresholds are subsequently reported (e.g., suggested) to the user. As previously discussed, the thresholds are defined with respect to any aspect that may improve the relevance or effectiveness of the data-analytic visualizations generated. At 228, only those data-analytic visualizations generated by the machine learning model that meet the applied thresholds are reported to the user by the data analytics system. On the other hand, if no thresholds are set, at 224, then those enhanced data-analytic visualizations generated at 222 are subsequently reported to the user at 228.

In conjunction with reporting 228 the data-analytic visualizations, the machine learning model may also report to the user any comments the advanced user may have included with the data-analytic visualizations when the machine learning model was trained, or other criteria recorded, for example, the order in which visualizations were generated by an advanced user. As previously discussed, comments may include, for example, why one visualization may be deemed more effective than another visualization, or what data fields, parameters, or process-flow steps were considered in generating the visualization by the advanced user, or other aspects the advanced user may have deemed helpful. Also in conjunction with reporting the data-analytic visualizations, the data analytics system may optionally receive interaction from the user regarding the data-analytic visualizations reported. For example, the data analytics system may offer a voting or scoring (collectively referred to as "voting") option to allow the user to vote on or assign a relative score to the data-analytic visualizations reported, representing the user's perspective on how helpful such visualizations were for the specific investigation performed by the user. The voting may then be recorded into the machine learning model to further train it, and then considered when generating data-analytic visualizations from the model. Thus, enhanced, effective data-analytic visualizations are reported to the user of the visual analytics data system based on the machine learning model, and even more-effective data-analytic visualizations are reported if thresholds are applied and/or voting aspects considered.

The system and/or operations of methods described in this disclosure may be embodied in whole or in part as programming instructions, for example, firmware or software. The instructions may be stored on a transitory or non-transitory, machine-readable medium (e.g., computer/processor-readable medium), including a random-access memory (RAM), read-only memory (ROM), flash memory, cache memory, solid-state drive (SSD), hard disk drive (HDD), or combinations thereof, for execution on one or more processors in one or more computing systems. In some examples, implementing the operations of these methods may be achieved by one or more processors, or processor cores, reading and executing the programming instructions stored in the memory. In other examples, implementing the operations of the methods may be achieved using an application-specific integrated circuit (ASIC), such as a system-on-chip (SOC), and/or other hardware components either alone or in combination with programming instructions executable by one or more processors in one or more computing systems.

The example methods described in this disclosure may include more than one implementation, and different implementations may not employ every operation presented in a respective flow diagram, or may employ additional steps not shown in the respective diagram. Therefore, while the operations of methods are presented in a particular order within the flow diagrams, the order of their presentations is not intended to be a limitation as to the order in which the operations may actually be implemented, or as to whether all of the operations may be implemented. For example, one implementation might be achieved through the performance of a number of initial operations, without performing one or more subsequent operations, while another implementation might be achieved through the performance of all of the operations.

Figure 3:
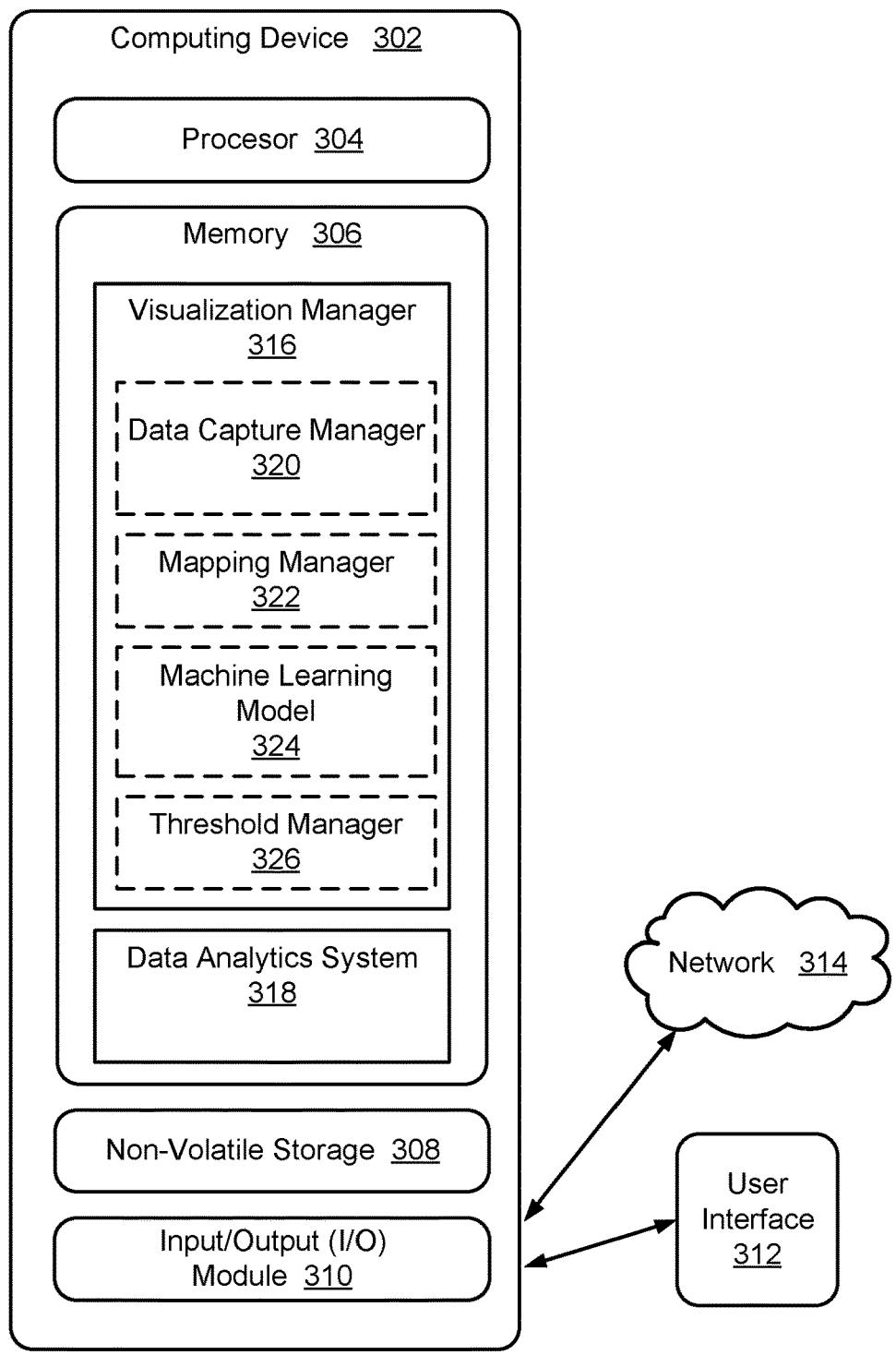
FIG. 3 is a block diagram of an example computing device having a visualization manager for enhancing data-analytic visualizations of a data analytics system.

FIG. 3 is a block diagram 300 illustrating an example computing device 302 configured according to principles of the present disclosure. The computing device 302 may include a processor 304, a memory 306, a non-volatile storage 308, and an input/output (I/O) module 310. The computing device communicates with a user interface 312 and a network 314 through the I/O module 310. As some non-limiting examples, the computing device 302 may be a server, desktop computer, notebook computer, mobile device, handheld device, or other computing device or system. The processor 304 may be any central processing unit (CPU) with one or more cores. The memory 306 may be any transitory and/or non-transitory, machine-readable media (e.g., computer/processor-readable media), such as a RAM, ROM, flash, cache, SSD, or a combination thereof, for storing program files, data, an operating system, and other executable instructions. The non-volatile storage 308 may be any ROM, flash, HDD, SSD, or similar storage device, for permanently storing program files, data, an operating system, and other executable instructions.

The user interface 312 may be a display, monitor, screen, touch screen, keyboard, mouse, other input or output device, or any combination configuration of these devices to display or otherwise provide information from the computing device to a user, and to allow the user to input information into the computing device. The network 314 may be any local area network (LAN), wide area network (WAN), cloud, multi-cloud, hybrid cloud, or private on-premise cloud computing environment, by which the computing device 302 may communicate with other networked devices, computing devices, or systems.

Memory 306 includes a visualization manager 316 and data analytics system 318. In this example, the visualization manager 316 is depicted simply as an application configured with executable instructions, for instance, firmware or software, for execution on the processor 304. However, the operations of the visualization manager 316 may be implemented in whole or in part using an ASIC, such as a SoC, and/or other hardware components either alone or in combination with programming instructions executable by the processor. The visualization manager 316 may include manager modules, for example, a data capture manager 320, a mapping manager 322, a machine learning model 324, and a threshold manager 326. These manager modules are shown separately in the illustration for discussion purposes, but may be combined, or further separated into additional modules, according to design and functional preference. Similarly, visualization manager 316 and data analytics system 318 may be configured as a single application, defined by separate functional modules.

The data analytics system 318 may be any data analytics system designed for enabling data investigations by a user, for instance studying, reviewing, analysing, and reporting on data, and for visually analyzing those investigations with data-analytic visualizations, for example with charts, graphs, or other visual representations. The data analytics system 318 may provide data analytics relevant to any business analytics or intelligence, including for security, logistics, supply management, marketing, sales, information technology management, resource management, and others. Although visualization manager 316 and data analytics system 318 are shown as applications with executable instructions in the memory 306, this is simply illustrative for discussion purposes. For example, either one or both of these may be executed locally on computing device 302 as shown, or executed remotely via network 314 relative to a separately networked computing device, such as using a software as a service (SaaS) model, or a combination of local and remote execution.

Returning now to the visualization manager 316, the data capture manager 320 is designed to capture input data and output data (input/output data) that are associated with data-analytic visualizations generated by users using the data analytics system 318. In one aspect, the data capture manager 320 captures input data and output data from data-analytic visualizations generated by advanced users so that the machine learning model 324 may be appropriately trained. In another aspect, the data capture manager 320 captures input data and output data from data-analytic visualizations generated by non-advanced users in order for the visualization manager 316 to then reference the machine learning model which will infer and generate enhanced data-analytic visualizations to report to the user. In this non-advanced user context, the input data and output data may or may not be used to train the machine learning model, depending on design configuration parameters.

In one example, the data capture manager 320 is designed to identify and distinguish between an advanced user and other users, such as a novice user or other non-advanced user, by referencing internal business organization user profiles. In another example, the data capture manager 320 captures all input/output data of data-analytic visualizations generated by pre-designated or defined authorized users of the visualization manager 316 or the data analytics system 318. Alternatively, a security login may be provided to ensure only advanced users train the machine learning model 324. This ensures that non-advanced user data-analytic visualizations are not recorded in training the model for learning purposes. Consequently, the input/output data of visualizations generated by advanced users are captured by the data capture manager 320 for training the machine learning model 324.

The mapping manager 322 maps into data pairs the input data and output data captured from the data-analytic visualization generated during the advanced user's analytic investigation. For example, input data selected by the advanced user to generate a data-analytic visualization are mapped to resulting output data defining the data-analytic visualization. Input/output data pairs captured for each data-analytic visualization generated by each advanced user are mapped, creating multiple input/output data pairs, thus summarizing the data-analytic visualizations generated by the advanced users.

These mapped input/output data pairs are recorded into the machine learning model 324 for training the model. For example, the mapped input/output data pairs may be recorded into tables or other formats accepted by the model. In one example, the machine learning model 324 continues to learn and grow based on the data capture manager 320 continuously capturing data-analytic visualizations generated by advanced users when the data analytics system is used. In this context, the mapping manager 322 continuously maps those input/output data pairs into the machine learning model 324.

In one embodiment the machine learning model 324 is a hybrid, semi-supervised learning model configured to generate a function that, given an input data, estimates or infers the best fitting output (e.g., data-analytic visualizations) based on training examples. Each training example is a data pair consisting of input data and desired output data to infer (e.g., generate) the best fitting data-analytic visualizations. Since the same input data may have several outputs (several visualizations may be created by experts to visualize the same input), the machine learning model is configured as a multi-output classification function. In this context, the machine learning model 324 may function, for example, according to algorithms commonly described as k-nearest neighbors (ML-kNN), decision trees (MMDT), neural networks (BP-MLL), or a combination thereof. Once the machine learning model 324 is sufficiently trained, as designated by design parameters, the model may be used and leveraged relative to any user that uses the data analytics system 318. Determining when the model is sufficiently trained may be guided by design preferences and usage factors. For example, the model may be sufficiently trained after capturing the input/output data of a defined number of data-analytic visualizations generated by numerous advanced users during numerous investigations using the data analytics system 318.

As the data analytics system 318 is used, and references the machine learning model 324 to generated data-analytic visualizations, the threshold manager 326 applies one or more optional thresholds to the data-analytic visualizations generated from investigations being performed by any user. Consequently, only data-analytic visualizations generated that meet the one or more thresholds are reported to the user by the data analytics system 318. As previously discussed, an example threshold may be defined as a percentage-of-usage of data-analytic visualizations defined in the trained model. Another example threshold may be a data-point to data-point change in data-analytic visualizations generated. Thus, enhanced, effective data-analytic visualizations are reported to the user of the data analytics system, based on leveraging the machine learning model 324 and applying thresholds by the threshold manager 326. The data-analytic visualizations are enhanced and effective, for example, in terms of fit for purpose, comprehensive consideration, and exposure of anomalies, trends, and/or patterns.

Figure 4:
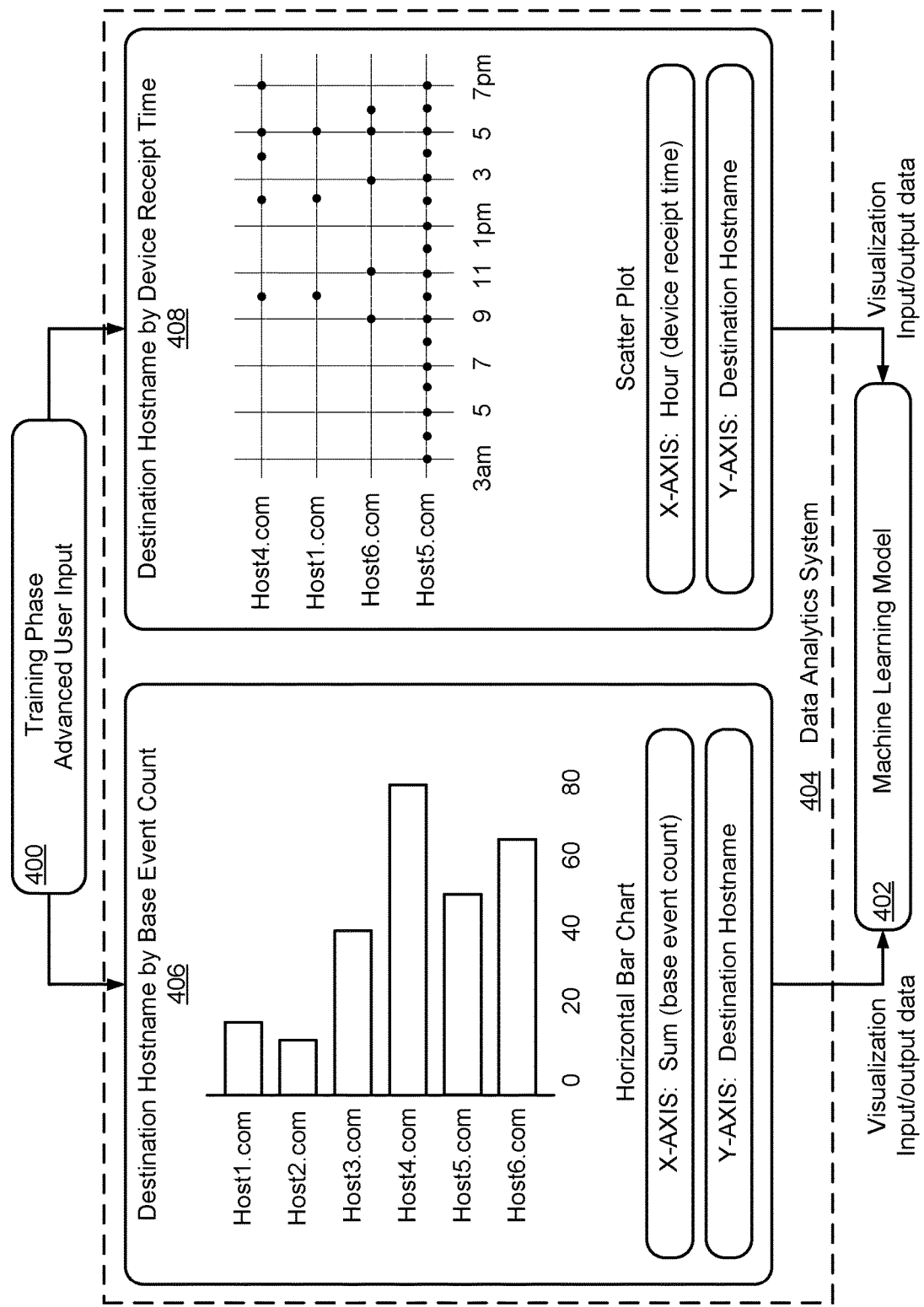
FIG. 4 is a block diagram illustrating a first example training phase for a machine learning model configured for enhancing data-analytic visualizations of a data analytics system.

FIG. 4 is a block diagram illustrating a first example training phase 400 by an advanced user for a machine learning model 402 that is configured for enhancing data-analytic visualizations of a data analytics system 404. In this example, the data analytics system 404 is a cybersecurity data analytics system. Also in this example, an advanced user analyst uses the data analytics system 404 to analyze outbound communication from identified hosts (e.g., hostnames Host1.com to Host6.com). The advanced user analyst enters first input data 400 into the data analytics system 404 and generates data-analytic visualization 406. The advanced user then enters second input data 400 into the data analytics system 404 and generates data-analytic visualization 408. Visualization 406 is defined to identify destination hostname by base event count using the following parameters:
 Chart type=horizontal bar chart
 X-axis=sum (base event count)
 Y-axis=destination hostname
Visualization 408 is defined to identify destination hostname by device receipt time using the following parameters:
 Chart type=scatter plot
 X-axis=device receipt time, aggregated by hours
 Y-axis=destination hostname The input data and output data associated with each visualization 406 and 408 are captured. The input data for visualization 406 is mapped together with the respective output data for visualization 406 as an input/output data pair. Similarly, the input data for visualization 408 is mapped together with the respective output data for visualization 408 as an input/output data pair. The machine learning model 402 is trained by recording the mapped input/output data pairs for each visualization. An example machine learning model 402 that is trained to generate an enhanced, effective output data-analytic visualization responsive to given input data is shown in Table 1 below.

TABLE 1

MACHINE LEARNING MODEL

| ROW | INPUT | OUTPUT (ENHANCED VISUALIZATION) |
|---|---|---|
| 1 | destination hostname | Visualization 406 |
|   |   | Visualization 408 |

TABLE 1-continued

MACHINE LEARNING MODEL

| ROW | INPUT | OUTPUT (ENHANCED VISUALIZATION) |
|---|---|---|
| 2 | base event count destination hostname | Chart type = horizontal bar chart<br>X-axis = Sum(base event count)<br>Y-axis = destination hostname<br>Visualization 406 |
| 3 | device receipt time destination hostname | Chart type = scatter plot<br>X-axis = device receipt time, aggregate by hour<br>Y-axis = destination hostname<br>Visualization 408 |

In this example, assume an advanced user security analyst is investigating a malware alert and tries to determine if there is a suspicious outgoing communication. He may create the bar chart 406 that displays the number of communications from the internal host under investigation to external destination hosts it communicated with over the last twenty-four hours. If the chart does not reveal anything outstanding, he might conclude there is no suspicious outgoing communication. However, if he looks at the exact same data from a different angle he may be presented with a totally different perspective. For example, by using a time-series scatter plot, and aggregating the communication by hours with the X axis representing time by hours over the last twenty-four hours, and the Y axis representing the destination hostname, he may clearly see there is a constant communication in fixed time intervals to one of the destinations. By using the scatter plot he can see that there is a suspicious outgoing communication with Host5, and he may also have found the attacker command and control server the internal host is communicating with. In this example, had the analyst not tried a different angle (time series vs. counts) for the same exact data, and had he not chosen the right granularity (twenty-four hours divided by one-hour aggregations), he would have missed spotting the suspicious communication and suspicious external destination. The different angle, right parameters, and granularity made all the difference between exposing a threat and missing it. Thus, it is an advanced user's generated data-analytic visualizations 406 and 408 that are captured to train the machine learning model 402.

Figure 5:
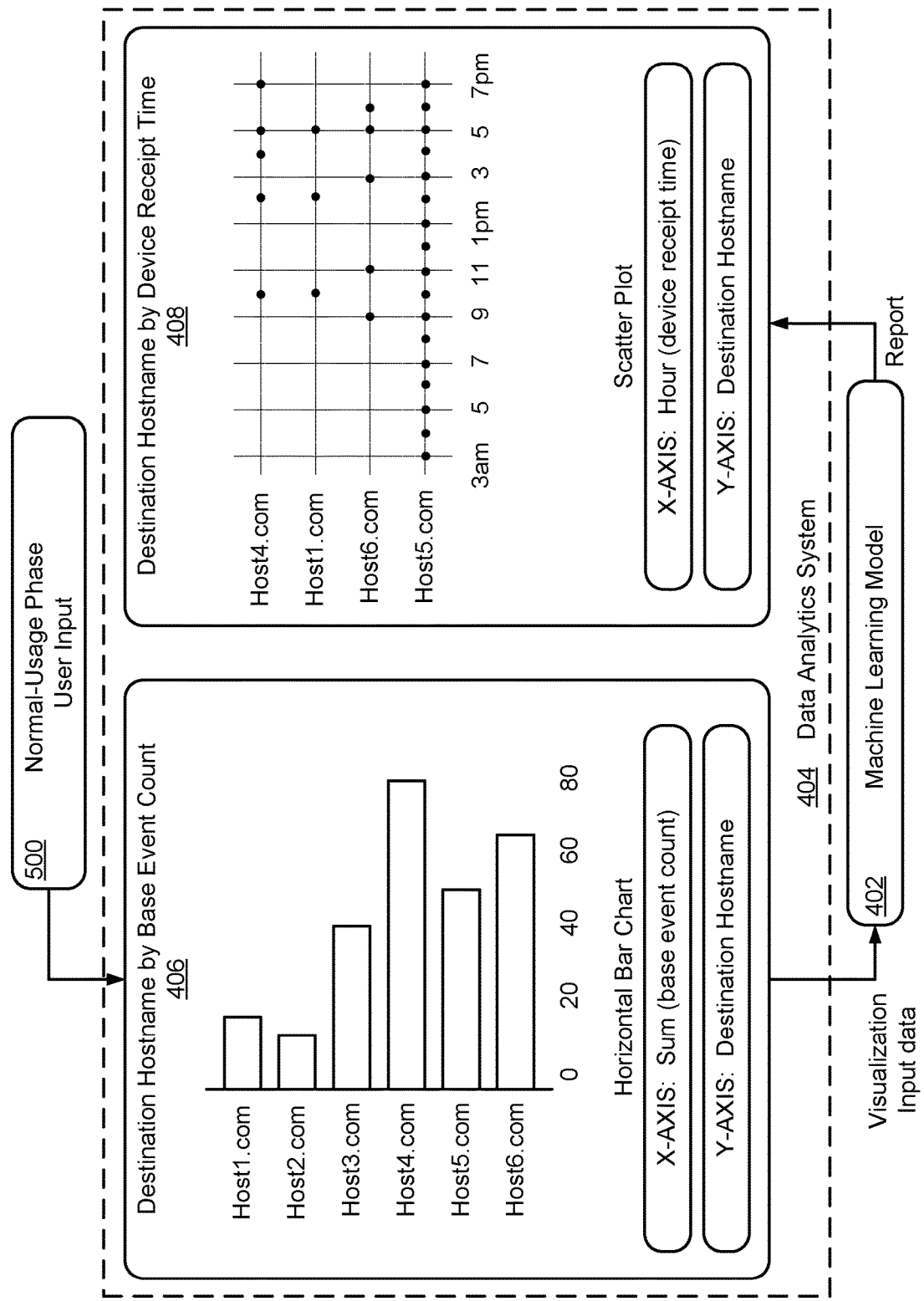
FIG. 5 is a block diagram illustrating a first example usage phase of a data analytics system configured with a machine learning model for enhancing data-analytic visualizations.

FIG. 5 is a block diagram illustrating a first example real-time, normal-usage phase 500 for a user of a data analytics system 404 configured with a machine learning model 402 for enhancing data-analytic visualizations. Again, in this example, the data analytics system 404 is a cybersecurity data analytics system. In this example, a novice user analyst uses the data analytics system 404 to analyze outbound communication from an internal host under investigation to external destination hosts (e.g., hostnames Host1.com to Host6.com). The novice analyst inputs data into the data analytics system 404 and may generate data-analytic visualization 406 to identify destination hostname by base event count using the following parameters:

Chart type=horizontal bar chart
    X-axis=sum (base event count)
    Y-axis=destination hostname However, this bar chart is ineffective to identify the information the advanced user previously identified relative to visualization 408 and was learned by the machine learning model 402. To account for this limitation and provide an enhanced, more effective visualization, the data analytics system 404 references the machine learning model 402 relative to the user input data, or relative to the input/output data captured from the user's generated data-analytic visualization 406. The machine learning model 402 associates the user input data (or input/output data captured) with the learned data in the model. In this example, the model 402 references the user input data with Table 1 (above) and identifies it in the Input column of Row 1 and/or Row 2. The data analytics system 404 won't report the data-analytic visualization 406 that already exists. Consequently, the data analytics system 404 generates and reports the data-analytic visualization 408 based on the machine learning model 402, as noted in the Output column of Row 1 of Table 1. This visualization 408 is the scatter plot learned by the model from the advanced user during the prior training phase. The model may also provide an explanation of the suggested changes, such as chart type, angle (time series), and time aggregations.

Figure 6:
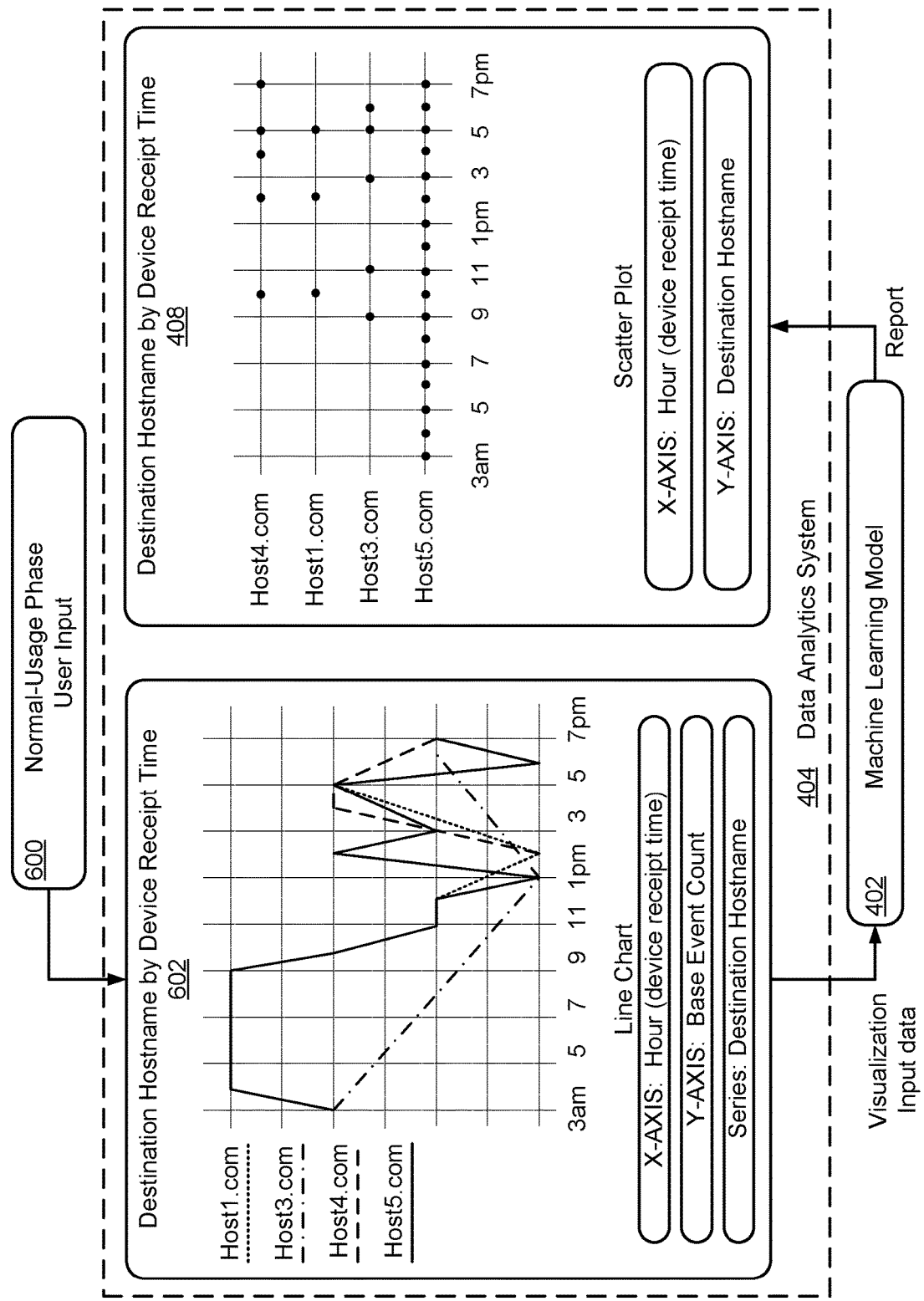
FIG. 6 is a block diagram illustrating a second example usage phase of a data analytics system configured with a machine learning model for enhancing data-analytic visualizations.

FIG. 6 is a block diagram illustrating a second example real-time normal-usage phase 600 for a user of a data analytics system 404 configured with a machine learning model 402 for enhancing data-analytic visualizations. In this example, a novice user analyst again uses the data analytics system 404 to analyze outbound communication from an internal host under investigation. This time the novice analyst inputs data into the data analytics system 404 and may generate data-analytic visualization 602 to identify destination hostname by device receipt time using the following parameters:

Chart type=line chart
    X-axis=hour (device receipt time)
    Y-axis=base event count
    Series=destination hostname The novice analyst created a straight forward communication over time line-chart visual, which really is unclear for providing beneficial or effective information in this investigation. The machine learning model 402 associates the user input data with the learned data in the model. In this example, the model 402 references the user input data with Table 1 (above) and identifies it in the Input column of Row 3 (based on a similarity function, for example). Consequently, the data analytics system 404 generates the data-analytic visualization 408 based on the learned machine learning model 402, as noted in the Output column of Row 3 of Table 1. The model suggests to change the chart type into a scatter plot visualization 408 using an hour time-based aggregation. The data-analytic visualization 408 is the scatter plot learned by the model from the advanced user during the prior training phase, and represents an enhanced visualization relative to the novice user's initial visualization 602.

Figure 7:
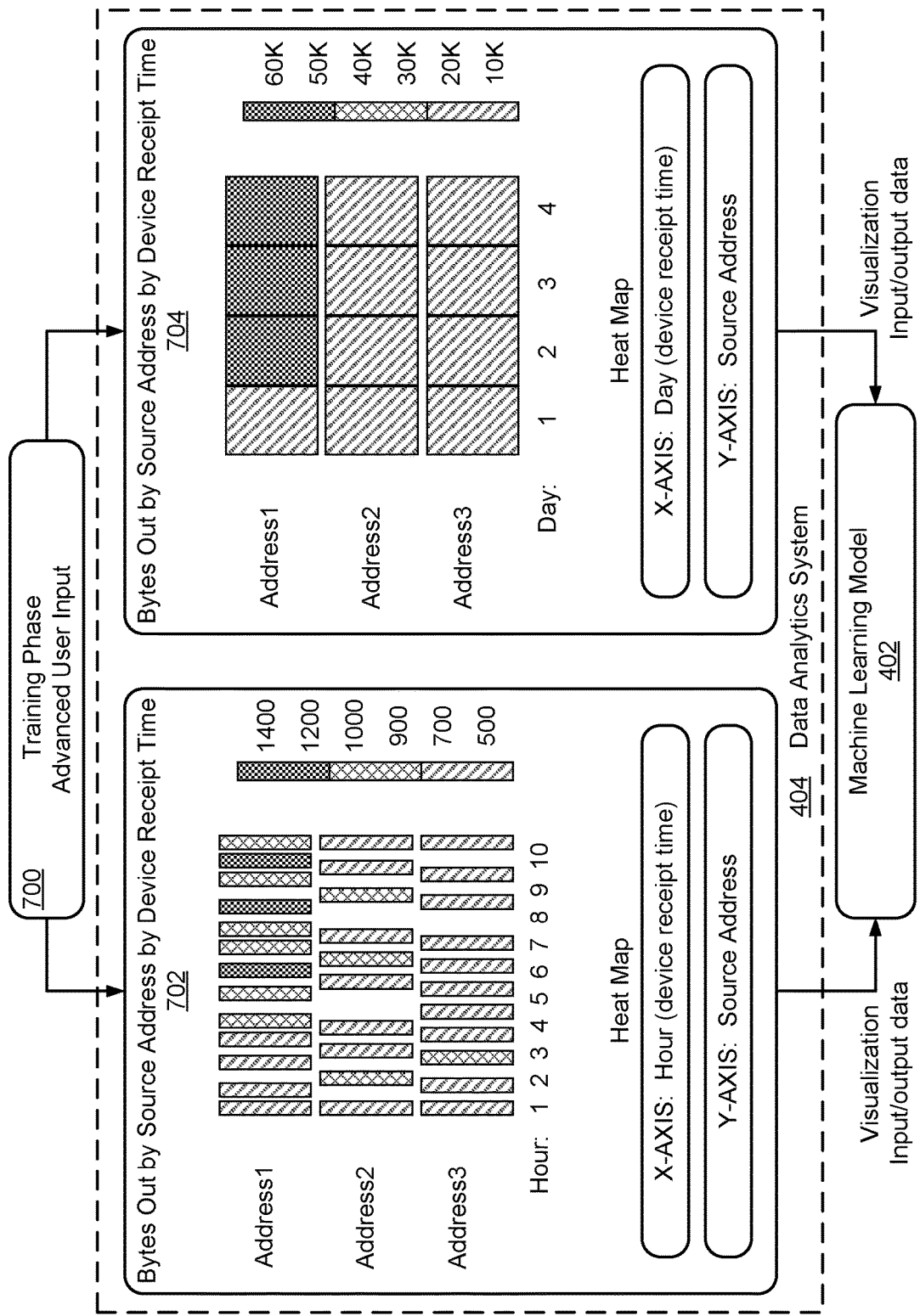
FIG. 7 is a block diagram illustrating a second example training phase for a machine learning model configured for enhancing data-analytic visualizations of a data analytics system.

FIG. 7 is a block diagram illustrating a second example training phase 700 by an advanced user for training a machine learning model 402 that is configured for enhancing data-analytic visualizations of a data analytics system 404. In this example, the data analytics system 404 is again a cybersecurity data analytics system. FIG. 7 represents an advanced user analyst using the data analytics system 404 to analyze bytes out over time, with respect to identified addresses (e.g., Address1 to Address3), by using a heat map visualization. The advanced user analyst separately inputs data into the data analytics system 404 to generate two data-analytic visualizations 702 and 704. Data-analytic visualization 702 is defined to identify bytes out by source address by device receipt time, using the following parameters:

Chart type=heat map
 X-axis=device receipt time, aggregated by hours
 Y-axis=source address
 Color=bytes out Data-analytic visualization 704 is also defined to identify bytes out by source address by device receipt time, but using the following parameters Chart type=heat map
 X-axis=device receipt time, aggregated by days
 Y-axis=source address
 Color=bytes out The advanced user starts his investigation with the default granularity being hours, as demonstrated by the data-analytic visualization 702 generated. But nothing stands out. So being an advanced user, he knows from experience that he should try different time granularities. So he changes to a granularity by day, which causes the anomalous behavior to stand out in data-analytic visualization 704. The input/output data associated with each data-analytic visualization generated 702 and 704 are captured. The input/output data are mapped into data pairs, and the machine learning model 402 is trained by recording the mapped input/output data pairs to the model, to generate an example model as shown in Table 2 below.

TABLE 2

| | MACHINE LEARNING MODEL | |
|---|---|---|
| ROW | INPUT | OUTPUT (ENHANCED VISUALIZATION) |
| 1 | Device receipt time<br>Source address<br>Bytes out | Visualization 702<br>Visualization 704 |

Figure 8:
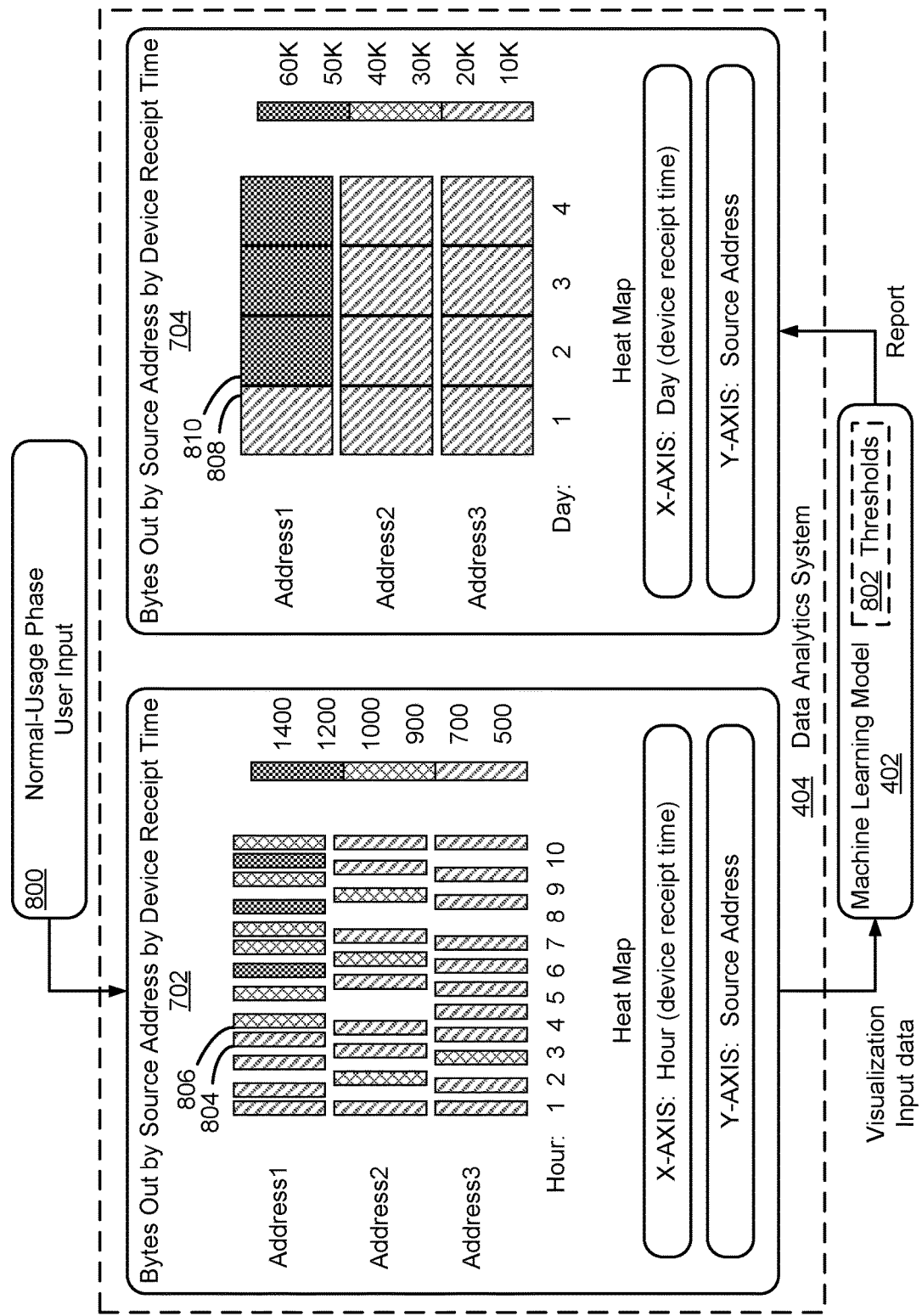
FIG. 8 is a block diagram illustrating a third example usage phase of a data analytics system configured with a machine learning model and thresholds for enhancing data-analytic visualizations.

FIG. 8 is a block diagram illustrating a third example real-time, normal-usage phase 800 by a user of a data analytics system 404 configured with a machine learning model 402 for enhancing data-analytic visualizations. Again, the data analytics system 404 is a cybersecurity data analytics system. In this example, a novice user analyst uses the data analytics system 404 to analyze bytes out over time relative to identified addresses. The novice analyst inputs data into the data analytics system 404 and generates the data-analytic visualization 702 heat map to identify bytes out by source address by device receipt time, using the following parameters:

Chart type=heat map
 X-axis=device receipt time, aggregated by hours
 Y-axis=source address
 Color=bytes out However, this heat map 702 is ineffective to identify the information the advanced user previously identified relative to data-analytic visualization 704 and was previously learned by the machine learning model 402. To account for this limitation and provide an enhanced visualization, the data analytics system 404 references the machine learning model 402 relative to the user input data. The machine learning model 402 associates the user input data with the learned data in the model. In this example, the model 402 references the user input data with Table 2 (above) and identifies it in the Input column of Row 1. Consequently, the data analytics system 404 generates the data-analytic visualization 704 based on the machine learning model 402, as noted in the Output column of Row 1 of Table 2. This visualization 704 is the heat map learned by the model from the advanced user during the prior training phase.

In this example, the machine learning model 402 also detects that a threshold 802 is set in the model to be applied to data-analytic visualizations. Here, the threshold is a data-point to data-point change threshold that must be met for a generated data-analytic visualization to be reported. In this example, the data-point to data-point change is defined as a 50% threshold for bytes out. This means that the machine learning model 402 and the data analytics system 404 will only report a data-analytic visualization if the 50% threshold is met. As noted with respect to data-analytic visualization 702, the 50% threshold is not met as between any time stamps/data points, for example as indicated at 804 and 806, for bytes out. So this visualization 702 will not be reported (e.g., suggested) to the user. However, the 50% threshold is met for data-analytic visualization 704 as between time stamps indicated at 808 and 810. Thus, data-analytic visualization 704 is generated by the data analytics system 404 and reported to the user.

Figure 9:
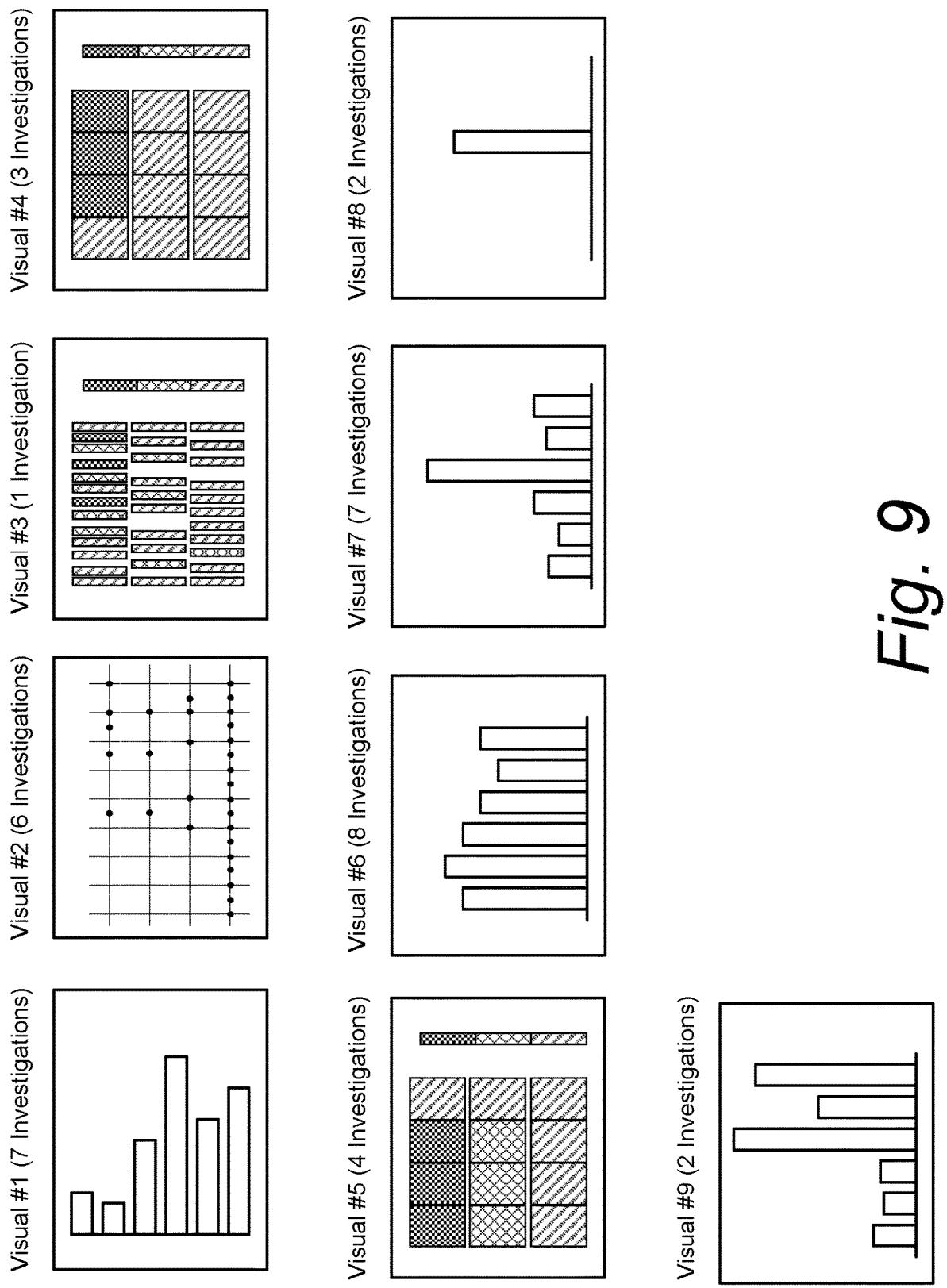
FIG. 9 illustrates example data-analytic visualizations generated by advanced users using a security data analytics system during a training phase for training a machine learning model.
Figure 10:
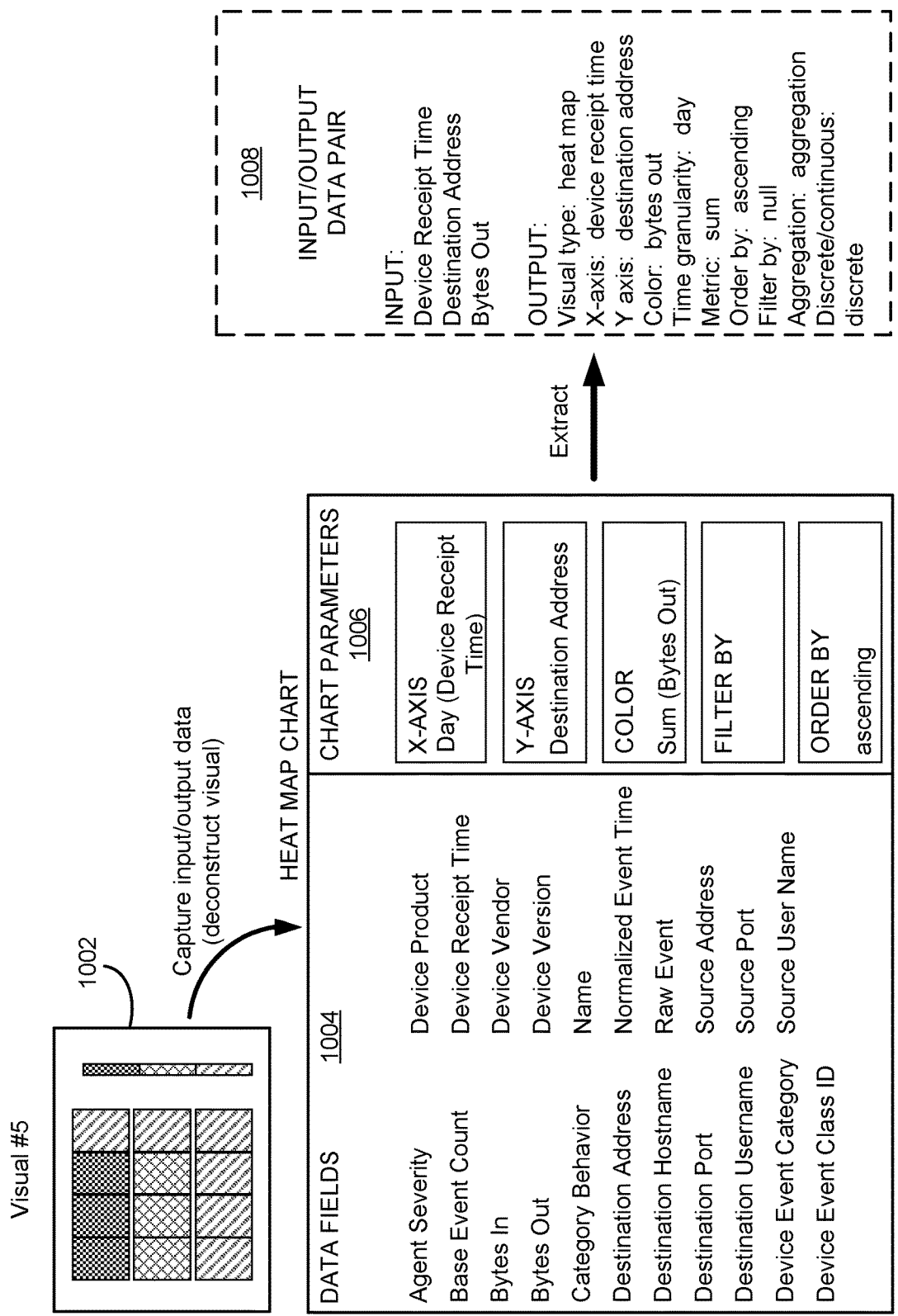
FIG. 10 is a block diagram illustrating an example of capturing input data and output data from a data-analytic visualization to deconstruct and map the data for training a machine learning model.
Figure 11:
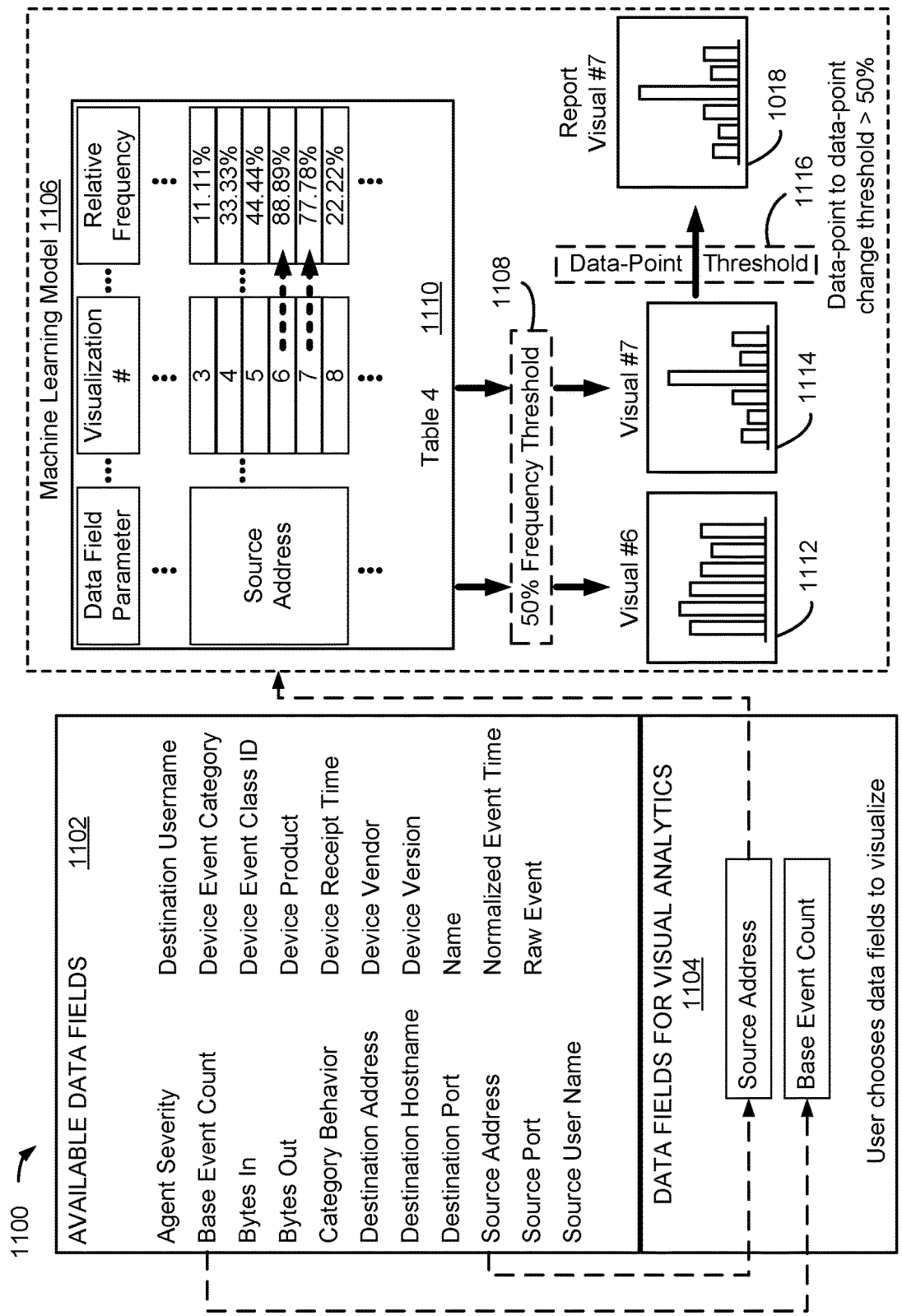
FIG. 11 is a block diagram illustrating an example usage of a data analytics system to generate and report a data-analytic visualization by referencing a machine learning model with an applied threshold.

FIGS. 9-11 will now be considered together to describe an overview of aspects of the present disclosure. As previously described, this may include advanced users generating data-analytic visualizations using a data analytics system. Input/output data of those visualizations are captured and mapped into data pairs. The data pairs are used to train a machine learning model. Then, when the data analytics system is in a normal-usage phase, data-analytic visualizations are generated, responsive to user input, by referencing the machine learning model. If the machine learning model includes a threshold, then the threshold is applied to the data-analytic visualizations generated. If any data-analytic visualization meets the threshold, they are then reported to the user. Or, if no threshold is set, then the visualizations generated by the machine learning model are simply reported to the user.

FIG. 9 illustrates nine example data-analytic visualizations generated by advanced users using a security-focused data analytics system during a training phase for training a machine learning model. In this example, ten separate investigations were performed by the advanced users, and 40 data-analytic visualizations were generated overall, represented by the nine data-analytic visualizations shown. The number of times each data-analytic visualization was generated is identified by the number of investigations noted in parenthesis next to each data-analytic visualization. In this context, each data-analytic visualization, referred to as a "visual" in the illustration for limited space purposes, was generated in a respective number of investigations, as follows:

Visual #1, in seven investigations;
 Visual #2, in six investigations;
 Visual #3, in one investigation;
 Visual #4, in three investigations;
 Visual #5, in four investigations;
 Visual #6, in eight investigations;
 Visual #7, in seven investigations;
 Visual #8, in two investigation; and
 Visual #9, in two investigations.

Data field parameters (e.g., input data), associated with generating each of these data-analytic visualizations in the data analytics system, is set forth in Table 3 below. These data-analytic visualizations are referenced in the below discussion for further describing the present disclosure including training a machine learning model, generating enhanced data-analytic visualizations, and optionally applying thresholds.

TABLE 3

| DATA FIELDS PARAMETERS | VISUAL # |
|---|---|
| Destination Hostname, Base Event Count | 1 |
| Destination Hostname, Device Receipt Time | 2 |
| Source Address, Device Receipt Time, Bytes Out | 3, 4, 5 |
| Source Address, Base Event Count | 6 |
| Source Address, Destination Address | 7 |
| Source Address, Base Event Count, Category Outcome | 8 |
| Destination User Name, Bytes Out, Device Receipt Time | 9 |

FIG. 10 is a block diagram illustrating an example of capturing input data and output data from an example data-analytic visualization of FIG. 9 to obtain and map the input/output data pair for training a machine learning model. This example refers to capturing input/output data from data-analytic visualization #5, at 1002 (e.g., this example deconstructs the data-analytic visualization Visual #5 of FIG. 9 to capture its input/output data). The input data captured from the Visual #5 are those data fields 1004 that were originally selected to generate the Visual #5, e.g., Device Receipt Time, Destination Address, and Bytes Out. The output data identified are the chart parameters 1006 that are captured. These describe the finished, generated data-analytic visualization, as follows:
Visual type: heat map,
X-axis: device receipt time
Y axis: destination address
Color: bytes out
Time granularity: day
Metric: sum
Order by: ascending
Filter by: null
Aggregation: aggregation
Discrete/continuous: discrete.

In this example, the machine learning model captured Visual #5 (of FIG. 9), deconstructed it to its parameters to capture the input/output data pair 1008, e.g., the input data (data fields 1004) and output data (the finished visualization parameters 1006). Similarly, all data-analytic visualizations generated by advanced users (e.g., the visualizations of FIG. 9), when training the machine learning model, go through this process to capture each visualization's respective input/output data pair. The output data that is captured is not the actual chart image, but all the parameters and their values, which in real time are plotted, thus enabling to re-generate the finished visualization to suggest to a user.

Table 4 (below) illustrates an example relative frequency table, based on an inferred model of the machine learning model, depicting example relative frequencies-of-usage of Visuals #1 through #9 from FIG. 9. The table is built upon the input/output data pairs obtained by the machine learning model by deconstructing the finished data-analytic visualizations it captured from tracking advanced users during the training phase. These relative frequencies identify how many investigations a specific visualization appeared in relative to (or out of) the number of investigations where the data field was used for visualization. In this example, these relative frequencies are used to identify and set a threshold value for the machine learning model, so that only data-analytic visualizations that meet the frequency threshold are reported to a user. The column labeled "No. of Investigations" represents the number of investigations where the data field parameter was used for generating a data-analytic visualization. The column labeled "Frequency" identifies in how many investigations the specific visualization appeared.

The column labeled "Relative Frequency" is calculated as follows: Relative Frequency=Frequency÷ No. of Investigations.

TABLE 4

| Data Field Parameter | No. of Investigations | Visualization # | Frequency | Relative Frequency |
|---|---|---|---|---|
| Bytes Out | 6 | 3 | 1 | 16.67% |
|  | 6 | 4 | 3 | 50.00% |
|  | 6 | 5 | 4 | 66.67% |
|  | 6 | 9 | 2 | 33.33% |
| Destination Hostname | 7 | 1 | 7 | 100.00% |
|  | 7 | 2 | 6 | 85.71% |
| Category Outcome | 2 | 9 | 2 | 100.00% |
| Source Address | 9 | 3 | 1 | 11.11% |
|  | 9 | 4 | 3 | 33.33% |
|  | 9 | 5 | 4 | 44.44% |
|  | 9 | 6 | 8 | 88.89% |
|  | 9 | 7 | 7 | 77.78% |
|  | 9 | 8 | 2 | 22.22% |
| Destination Address | 7 | 7 | 7 | 100.00% |
| Destination User Name | 2 | 9 | 2 | 100.00% |

Note that the inputs that were extracted from the finished visualizations (of FIG. 9) were deconstructed to their core components (single data fields). Time stamp fields and base event count field are ignored as they don't stand by themselves for this example implementation. In this example Table 4, the input/output data pairs for the machine learning model are Data Field Parameter and Visualization # respectively. The machine learning model serves to infer an output from a given input data in the normal usage phase to generate a data-analytic visualization to potentially report to a user. A similarity threshold may be used (based on distance calculation) to maximize compatibility with the actual input data which is composed of a combination of two or more data fields. In this example the relative frequencies-of-usage identified in Table 4 provide a basis on which a percentage-of-usage threshold may be set to apply against data-analytic visualizations generated. If thresholds are set, then visualizations generated that meet or exceed the thresholds are reported to the user.

FIG. 11 illustrates an example usage of a data analytics system 1100 by referencing selected data fields 1102, 1104, generating data-analytic visualizations by referencing a machine learning model 1106, and reporting the data-analytic visualization that meets the applied thresholds. In this example, the data analytics system 1100 displays available data fields 1102 from which a user selects some to generate a data-analytic visualization. Here, the data fields selected include "source address" and "base event count" as indicated in the display area labeled "data fields for visual analytics" 1104. In this example, only the data fields of interest (input data) are chosen by the user and passed to the machine learning model 1106. The model then infers relevant output data-analytic visualizations based on the input data to automatically generate effective data-analytic visualizations (e.g., visualizations #3 to #8 in the example shown).

In this example, the machine learning model 1106 recognizes that a percentage-of-usage threshold is set at 50%, defined as a 50% frequency threshold 1108, so the model processes the data from the relevant visualizations through the relative frequency table 1110 (which corresponds to Table 4 above). In this instance, Table 4, at 1110, indicates that only Visual #6 and Visual #7 have relative frequency percentages greater than 50%, with Visual #6 at 88.89% and Visual #7 at 77.78%. Accordingly, Visual #6 and #7 meet the 50% frequency threshold 1108 to be generated, as shown at 1112 and 1114 respectively. However, the machine learning model recognizes that a data-point threshold is also set at 50%, defined as a data-point to data-point change threshold 1116. In this instance, only Visual #7 meets the 50% data-point to data-point threshold 1116, so only Visual #7 is reported to the user (at 1018) as an enhanced, effective data-analytic visualization.

Although FIG. 11 describes receiving input data 1104 from a user and then having the machine learning model 1106 generate data-analytic visualizations based only on the input data, in another example the user may fully create (e.g., generate) their own data-analytic visualization rather than simply provide only the input data. In this context, the machine learning model 1106 captures the input data fields from the visualization generated by the user. Once the input data is captured, the machine learning model follows a similar process as described according to FIG. 11 to generate and report enhanced data-analytic visualizations. And, if one or more thresholds are set, report only those visualizations that meet the thresholds.

While this disclosure has been described with respect to example embodiments outlined above, it is evident that alternatives, modifications and variations will be apparent to those skilled in the art. Accordingly, the described and depicted examples of the present disclosure are intended to be illustrative, not limiting, and the subject of the appended claims is not necessarily limited to the specific features or methods described herein.

What is claimed is:

1. A method of enhancing visual analytics of a data analytics system, the method comprising:
    training a machine learning model to generate a data-analytic visualization responsive to user input data, wherein training the machine learning model comprises:
        generating, by a computing device, a plurality of data-analytic visualizations based on input data received from an advanced user;
        capturing, by the computing device, the advanced user input data and output data associated with each of the plurality of data-analytic visualizations generated using the data analytics system, wherein the advanced user input data comprises data fields selected by the advanced user associated with generating each data-analytic visualization and the output data comprises the generated data-analytic visualization and an indicator of what position in a sequential order each of the plurality of data-analytic visualizations is generated;
        mapping, by the computing device, an input data and output data pair for each of the plurality of data-analytic visualizations to define each data-analytic visualization generated; and
        training the machine learning model with the input data and output data pair for each of the plurality of data-analytic visualizations.

2. The method of claim 1, wherein capturing the input data and output data associated with each of the plurality of data-analytic visualizations comprises:
    deconstructing each of the plurality of data-analytic visualizations generated to capture each input data and output data pair.

3. The method of claim 2, wherein at least one of:
    the input data further comprises external profiling attributes comprising at least one of a time range associated with the data-analytic visualization, or the advanced user's role in a business organization for using the data analytics system; or
    the output data further comprises at least one of an identification of the data-analytic visualization being associated with a sequentially generated data-analytic visualization, or a process-flow indicia associated with generating the data-analytic visualization.

4. The method of claim 1, wherein the machine learning model comprises at least one of a hybrid machine learning model, a semi-supervised machine learning model, an unsupervised machine learning model, a supervised machine learning model, or combination thereof.

5. The method of claim 1, wherein the machine learning model infers an output relative to the input data captured, and wherein the output comprises at least one of the output data, parameters defining the data-analytic visualization, comments provided by the advanced user associated with the data-analytic visualization, or a combination thereof.

6. The method of claim 1, wherein the output data comprises comments provided by the advanced user relative to at least one of the data-analytic visualization generated, rationale describing an effectiveness of the data-analytic visualization, a data-analytic investigation performed by which the data-analytic visualization is generated, process-flow steps considered in generating the data-analytic visualization, data fields considered in generating the data-analytic visualization, or combination thereof.

7. The method of claim 1, wherein usage of the data analytics system occurs relative to at least one of the advanced user or a non-advanced user using the data analytics system.

8. The method of claim 1, further comprising:
    determining a usage of each data-analytic visualization responsive to each data-analytic visualization being generated during a usage of the data analytics system referencing the machine learning model; and
    reporting when the usage of each data-analytic visualization generated during the usage of the data analytics system meets a threshold, wherein the threshold identifies at least one of a percentage-of-usage with respect to the data-analytic visualization generated relative to the machine learning model, a data-point to data-point change with respect to data associated with the data-analytic visualization, a maximum number associated with reporting the data-analytic visualization, an identification of the data-analytic visualization generated being associated with a sequentially generated data-analytic visualization that is generated a defined number of times, a process-flow indicia associated with generating the data-analytic visualization, or combination thereof.

9. The method of claim 8, wherein the percentage-of-usage comprises a relative frequency of the data-analytic visualization generated relative to training the machine learning model.

10. The method of claim 8, wherein the data-point to data-point change comprises at least one of an anomaly in data of the data-analytic visualization or a pattern in data of the data-analytic visualization.

11. The method of claim 8, wherein the data-point to data-point change comprises at least one of a value difference between a data-point to an adjacent data-point in the data-analytic visualization, or a time-interval difference with respect to time data associated with the data-analytic visualization.

12. The method of claim 8, further comprising, responsive to reporting the data-analytic visualization, receiving at least one of a voting input, a scoring input, or combination thereof, relative to the data-analytic visualization reported for further training the machine learning model.

13. A data analytics system comprising:
a processor; and
a memory comprising instructions that, when executed by the processor, cause the processor to:
train a machine learning model to generate a data-analytic visualization responsive to user input data, wherein training the machine learning model comprises:
generate a plurality of data-analytic visualizations based on input data received from an advanced user;
capture input data and output data associated with each of the plurality of data-analytic visualizations generated by the data analytics system, wherein the input data comprises data fields selected by the advanced user associated with generating each data-analytic visualization and the output data comprises the generated data-analytic visualization and an indicator of what position in a sequential order each of the plurality of data-analytic visualizations is generated;
map an input data and output data pair for each of the plurality of data-analytic visualizations to define each data-analytic visualization generated; and
train the machine learning model using the input data and output data pair for each of the plurality of data-analytic visualizations.

14. The data analytics system of claim 13, wherein the memory further comprises instructions that, when executed by the processor, cause the processor to:
determine a usage of each data-analytic visualization responsive to each data-analytic visualization being generated during a usage of the data analytics system referencing the machine learning model; and
report when the usage of each data-analytic visualization generated during the usage of the data analytics system meets a threshold.

15. The data analytics system of claim 14, wherein the threshold identifies at least one of a percentage-of-usage with respect to the data-analytic visualization generated relative to the machine learning model, a data-point to data-point change with respect to data associated with the data-analytic visualization, a maximum number associated with reporting the data-analytic visualization, an identification of the data-analytic visualization generated being associated with a sequentially generated data-analytic visualization that is generated a defined number of times, a process-flow indicia associated with generating the data-analytic visualization, or combination thereof.

16. The data analytics system of claim 15, wherein the data-point to data-point change comprises at least one of an anomaly in data of the data-analytic visualization or a pattern in data of the data-analytic visualization.

17. The data analytics system of claim 13, wherein the memory further comprises instructions that when executed by the processor cause the processor to deconstruct each of the plurality of the data-analytic visualizations generated to capture the input data and the output data, and wherein the input data is indicative of data fields selected by the advanced user for generating each data-analytic visualization, and the first output data is indicative of parameters defining the generated data-analytic visualization.

18. The data analytics system of claim 13, wherein the memory comprises instructions that when executed by the processor cause the processor to infer an output relative to second input data received by the data analytics system from a second user, and wherein the output comprises at least one of the output data, parameters defining the data-analytic visualization, comments provided by an advanced user associated with the data-analytic visualization, or a combination thereof.

19. The data analytics system of claim 14, wherein the memory comprises instructions that, when executed by the processor, cause the processor to receive at least one of a voting input, a scoring input, or combination thereof, from a second user relative to the data-analytic visualization reported, for further training of the machine learning model.

20. A non-transitory machine-readable storage medium storing instructions that, when executed by at least one computing device, cause the at least one computing device to:
train a machine learning model to generate a data-analytic visualization responsive to user input data, wherein training the machine learning model comprises instructions to:
capture the user input data and output data associated with each of a plurality of data-analytic visualizations generated by an advanced user using a data analytics system, wherein the user input data comprises data fields selected by the advanced user associated with generating each data-analytic visualization and the output data comprises the generated data-analytic visualization and an indicator of what position in a sequential order each of the plurality of data-analytic visualizations is generated;
map an input data and output data pair for each of the plurality of data-analytic visualizations to define each data-analytic visualization generated; and
train the machine learning model with the input data and output data pair for each of the plurality of data-analytic visualizations.

* * * * *